United States Patent

[11] 3,564,333

[72] Inventors Donald W. Cramer; Eugene W. Becker; Richard E. Meyer; Owen E. Reinert, St. Louis, Mo.

[21] Appl. No. 707,254
[22] Filed Feb. 21, 1968
[45] Patented Feb. 16, 1971
[73] Assignee National Standard Company a corporation of Delaware

[54] ELECTRIC WELDER THAT USES MAGNETIC AMPLIFIER TO SUPPLY FIRING SIGNALS FOR CONTROLLED RECTIFIER
27 Claims, 6 Drawing Figs.

[52] U.S. Cl. .................................................... 315/171, 315/119, 315/125, 315/126, 315/127, 315/128, 315/170, 315/174, 315/175, 315/176, 315/194, 315/200, 315/240, 315/241, 315/242, 315/243, 219/131, 219/135
[51] Int. Cl. .................................................... H05b 37/00
[50] Field of Search .................................................... 315/119, 123, 125, 126, 127, 128, 170, 171, 174, 175, 176, 194, 200, 240, 241, 242, 243, 307, 311, (Inquired); 219/131, 135; 323/43.5 (S), 89 (C), 89.12

[56] References Cited

UNITED STATES PATENTS

| | | | |
|---|---|---|---|
| 2,235,385 | 3/1941 | Rava | 315/241X |
| 3,193,725 | 7/1965 | Skirpan | 315/194 |
| 3,356,928 | 12/1967 | Parrish | 315/205X |
| 3,459,996 | 8/1969 | Adamson et al. | 219/135X |

*Primary Examiner*—John W. Huckert
*Assistant Examiner*—R. F. Polissack
*Attorney*—Kingsland, Rogers, Ezeli, Eilers and Robbins

ABSTRACT: The high frequency voltages, that are customarily used to help initiate the arcs of electric welders, tend to cause premature and erratic initiation of those arcs where those electric welders use silicon controlled rectifiers to control the amounts of power supplied to those arcs and use transistor-type firing circuits to control the firing angles of those silicon controlled rectifiers; because transistor-type firing circuits are sensitive to high frequency voltages. The present invention provides an electric welder which utilizes silicon controlled rectifiers to control the amounts of power supplied to arcs and yet avoids premature and erratic initiation of those arcs by using a magnetic amplifier to control the firing angles of those silicon controlled rectifiers. Also, the present invention keeps that electric welder from supplying undesirably high amounts of power to those arcs, during the initiation of those arcs, by biasing the magnetic core of that magnetic amplifier downwardly at the conclusion of each welding operation. In addition, the electric welder of the present invention has a one-turn winding, on the magnetic core of the magnetic amplifier thereof, through which all of the welding current flows; and that one-turn winding is part of a feedback circuit for that magnetic amplifier which enables that electric welder to vary the amounts of power supplied to an arc over the full range of firing angles of the silicon controlled rectifiers thereof by merely adjusting a single control of that magnetic amplifier.

Figure 1A:
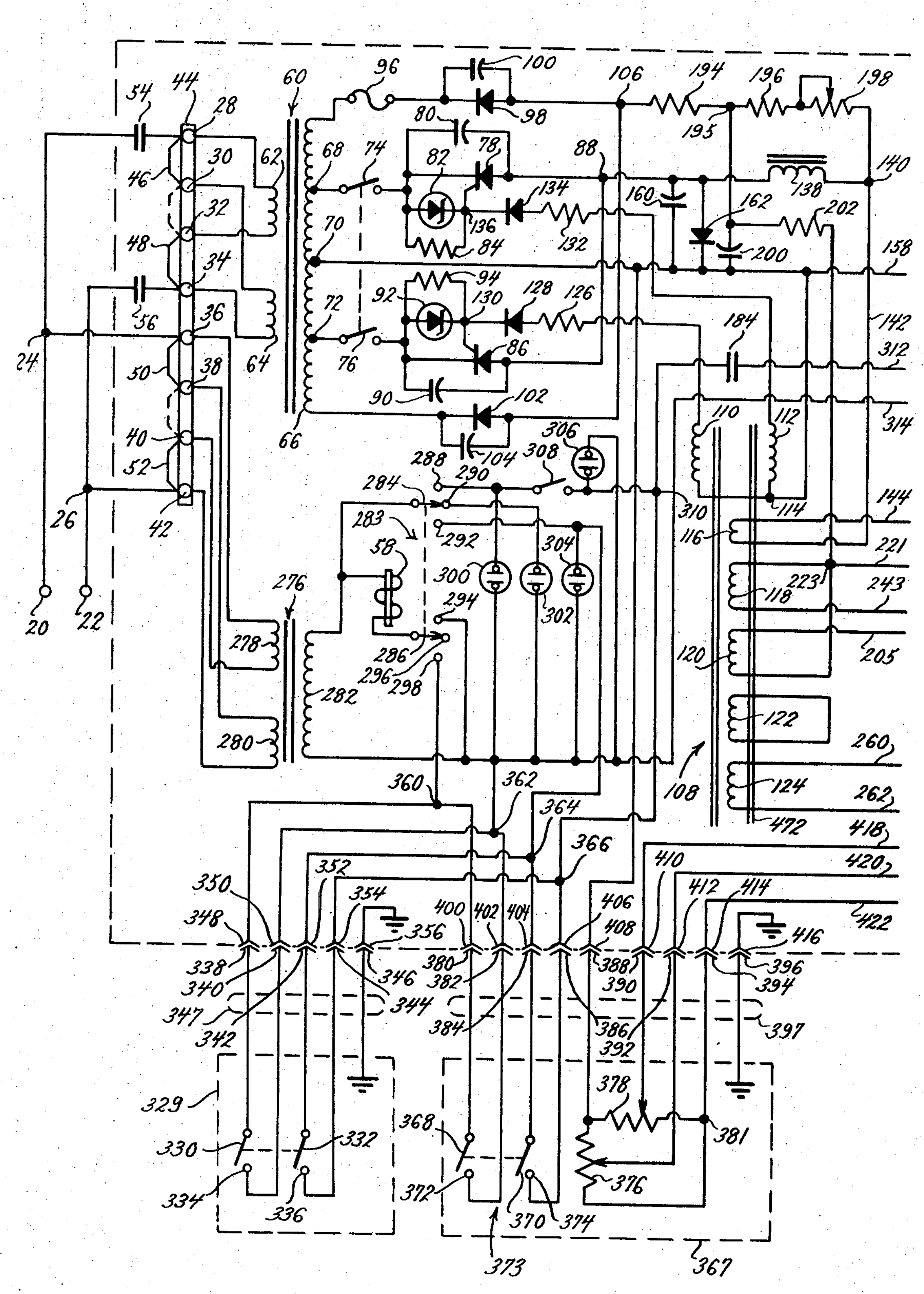

ELECTRIC WELDER THAT USES MAGNETIC AMPLIFIER TO SUPPLY FIRING SIGNALS FOR CONTROLLED RECTIFIER

This invention relates to improvements in Control Systems. More particularly, this invention relates to improvements in control systems for electric welders.

It is, therefore, an object of the present invention to provide an improved control system for an electric welder.

Electric welders are usually equipped with sources of high-frequency voltage to facilitate the initiation of arcs; and those sources of high-frequency voltage can cause premature and erratic initiation of those arcs where those electric welders use silicon controlled rectifiers to control the amounts of power supplied to those arcs and use transistor-type firing circuits to control the firing angles of those silicon controlled rectifiers. Specifically, where an electric welder utilizes one or more silicon controlled rectifiers to control the amounts of power supplied to arcs, and utilizes a unijunction transistor firing circuit to control the firing angles of the one or more silicon controlled rectifiers, that unijunction transistor firing circuit can occasionally be fired prematurely or erratically by the high-frequency voltages from the high-frequency source. Any such premature of erratic firing of the unijunction transistor firing circuit would lead to premature or erratic initiation of arcs; and all such premature or erratic initiation of arcs; and all such premature or erratic initiation of arcs would be objectionable. Consequently, it would be desirable to provide an electric welder which utilized silicon controlled rectifiers that could be fired by a firing circuit which was substantially insensitive to high-frequency voltages. The present invention provides such an electric welder by utilizing a magnetic amplifier to supply the firing signals for the silicon controlled rectifiers of that electric welder; and it is, therefore, an object of the present invention to provide an electric welder which utilizes silicon controlled rectifiers and which utilizes a magnetic amplifier to supply firing signals to those silicon controlled rectifiers.

The magnetic core of the magnetic amplifier of an electric welder tends, during any period of time when that electric welder is "off," to retain the magnetic flux density to which it was driven prior to the time that electric welder was turned "off." Where that magnetic flux density is high, the electric welder will tend to supply a large surge of energy to an arc as that arc is initiated; and that large surge of energy can pit, perforate or melt a thin workpiece. As a result, it has been difficult, with many electric welders which use magnetic amplifiers, to successfully weld thin workpiece. As a result, it has been difficult, with many electric welders which use magnetic amplifiers, to successfully weld thin workpieces. The present invention provides an electric welder which uses a magnetic amplifier, and which can be used to successfully weld thin workpieces, and it does so by providing a circuit which drives the magnetic flux density of the magnetic core of that magnetic amplifier downwardly as the electric welder is turned "off." It is, therefore, an object of the present invention to provide an electric welder which uses a magnetic amplifier, and which has a circuit that drives the magnetic flux density of the magnetic core of that magnetic amplifier downwardly as that electric welder is turned "off."

The electric welder provided by the present invention has a one-turn winding, on the magnetic core of the magnetic amplifier thereof, through which all of the welding current flows; and that one-turn winding is part of a feedback circuit for that magnetic amplifier. That feedback circuit enables that electric welder to vary the amounts of power supplied to an arc over the full range of firing angles of the silicon controlled rectifiers of that electric welder by merely adjusting a single control of that magnetic amplifier. It is, therefore, an object of the present invention to provide an electric welder which has a one-turn winding, on the magnetic core of the magnetic amplifier thereof, winding, on the magnetic core of the magnetic amplifier thereof, through which all of the welding current flows; and that one-turn winding is part of a feedback circuit for that magnetic amplifier.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 1B:
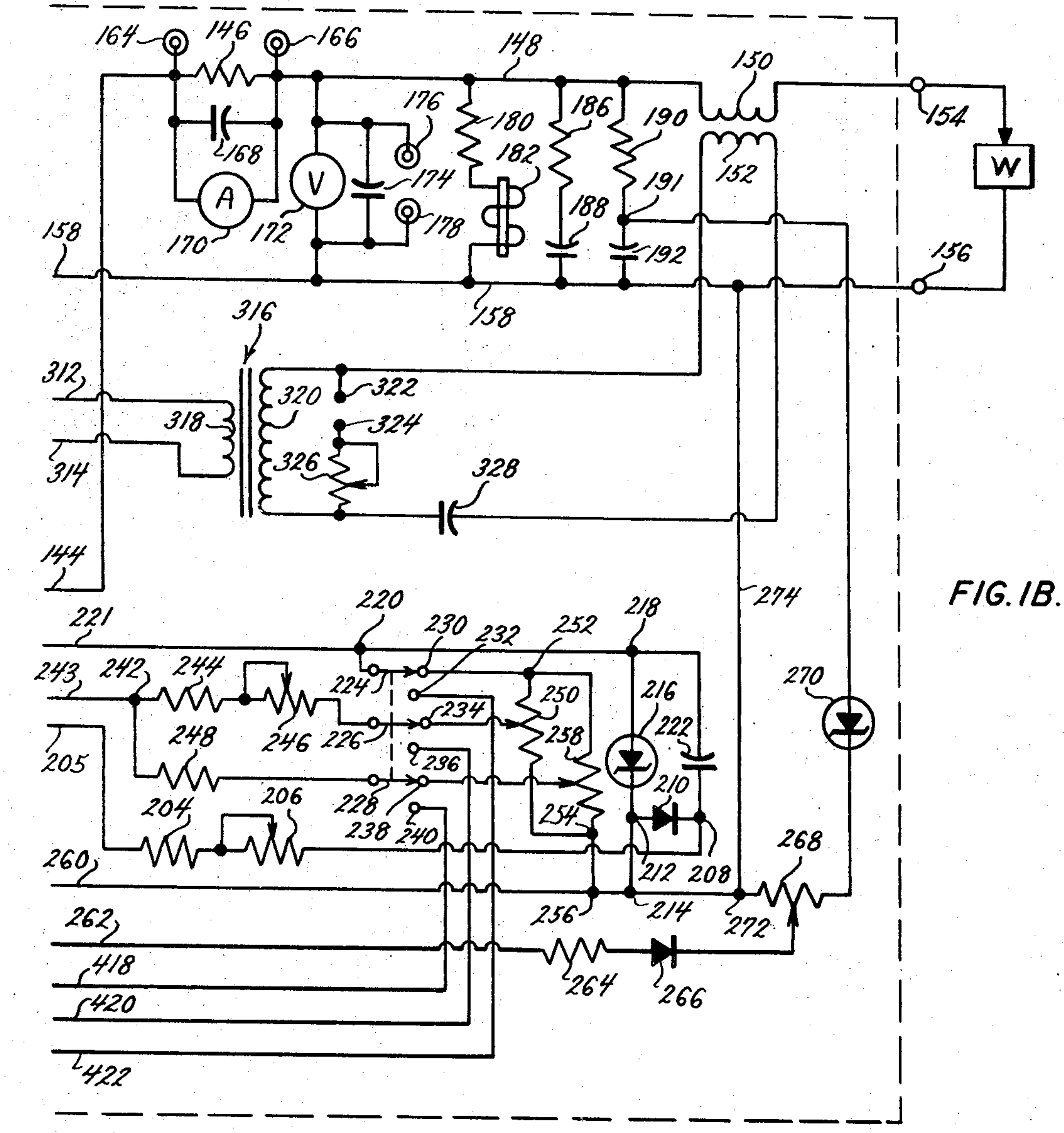
Figure 2:
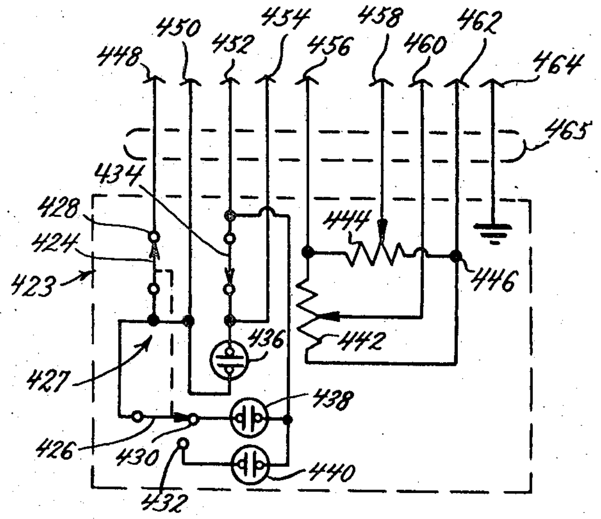
Figure 3:
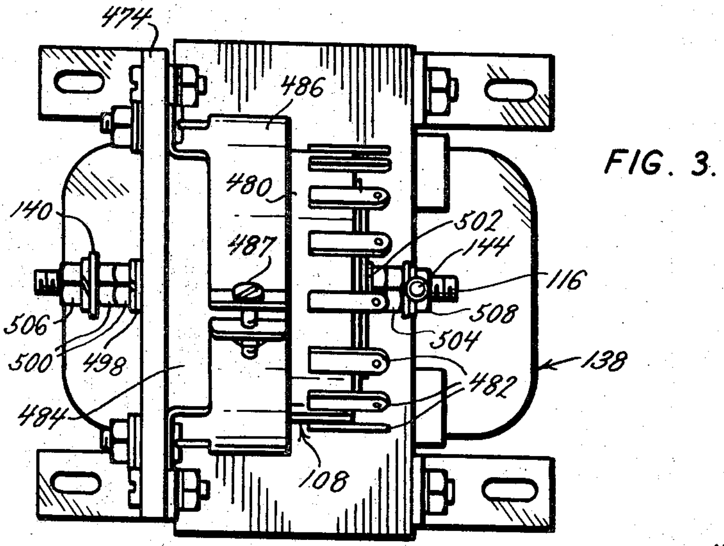
Figures 4, 5:
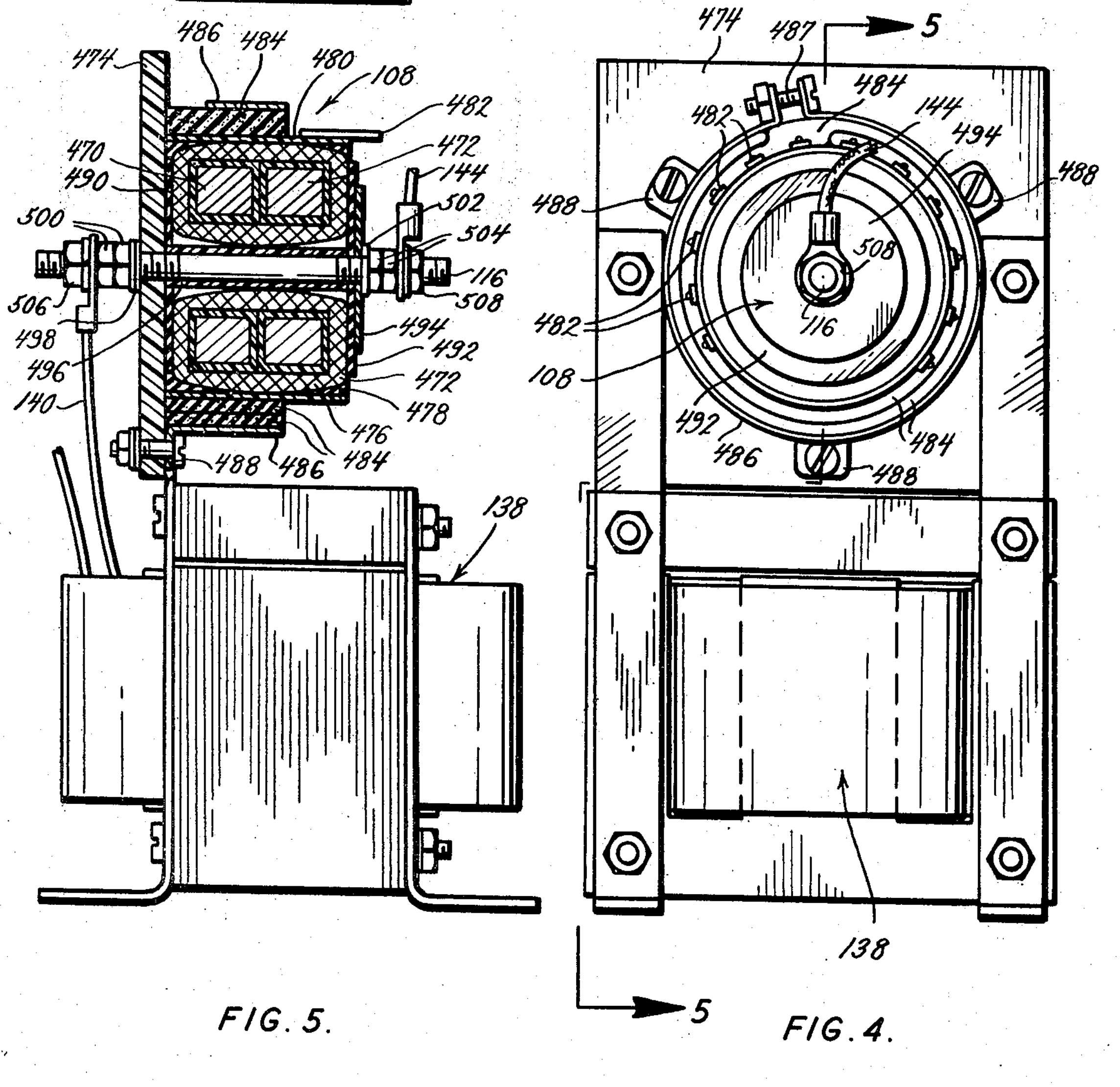

In the drawing, FIG. 1A is part of the circuit diagram of one preferred embodiment of electric welder that is made in accordance with the principles and teachings of the present invention, FIG. 1B is the rest of the circuit diagram of the electric welder provided by the present invention, FIG. 2 is the circuit diagram of a "remote control" used with the electric welder provided by the present invention, FIG. 3 is a plan view of the magnetic amplifier and inductor shown in FIG. 1A, FIG. 4 is a front elevational view of the magnetic amplifier and inductor shown in FIG. 3, and FIG. 5 is a sectional view through the magnetic amplifier and inductor of FIG. 4, and it is taken along the broken plane indicated by the broken line 5–5 in FIG. 4.

COMPONENTS OF ELECTRIC WELDER

Referring to the drawing in detail, the numerals 20 and 22 denote terminals which are connectable to a suitable source of alternating current; and, in the said preferred embodiment of electric welder provided by the present invention, the terminals 20 and 22 can be connected to a source of 230 volts or 460 volts, single phase 60 cycle per second alternating current. A junction 24 connects the terminal 20 directly to a terminal 36 on a terminal board 44; and that junction coacts with normally-open relay contacts 54 to connect the terminal 20 to a terminal 28 on that terminal board. A junction 26 connects the terminal 22 directly to a terminal 42 on that terminal board; and that junction coacts with normally-open relay contacts 56 to connect the terminal 22 directly to a terminal 42 on that terminal board; and that junction coacts with normally-open relay contacts 56 to connect the terminal 22 to a terminal 34 on that terminal board. The other terminals on that terminal board are denoted by the numerals 30, 32, 38 and 40. A jumper 46 is shown connected between the terminals 28 and 30, a jumper 48 is shown connected between the terminals 32 and 34, a jumper 50 is shown connected between the terminals 36 and 38, and a jumper 52 is shown connected between the terminals 40 and 42. However, where desired, the jumpers 46 and 48 can be removed and replaced by a jumper, shown in dotted lines in FIG. 1A; and the jumpers 50 and 52 can be removed and replaced by a jumper shown in dotted lines in FIG. 1A.

The relay contacts 54 and 56 are controlled by a relay coil 58 which is shown below the level of, and to the right of, the terminal board 44 in FIG. 1A. As long as that relay coil is deenergized, those relay contacts will remain open; but whenever that relay coil is energized, those relay contacts will close.

The numeral 60 generally denotes a transformer; and that transformer has primary windings 62 and 64. The jumpers 46 and 48 connect those primary windings in parallel, and thus enable those primary windings to be connected to a source of 230 volts alternating current. Where the control system shown by FIG. 1A is to be connected to a source of 460 volts alternating current, the jumpers 46 and 48 will be removed and will be replaced by the jumper shown in dotted lines in FIG. 1A to connect the primary windings 62 and 64 in series. The secondary winding of the transformer 60 is denoted by the numeral 66; and it has taps 68, 70 and 72. In the preferred embodiment of control system provided by the present invention, the secondary winding 66 will develop about 73 volts between the center tap 70 and either end thereof, and also will develop about 48 volts between that center tap and either of the taps 68 and 72 thereof.

The numerals 74 and 76 denote the normally-closed contacts of a current-responsive switch; and that switch will keep those contacts closed as long as the current flowing through either of those contacts does not exceed a predetermined value. However, whenever the current flowing through either of those contacts exceeds that predetermined value for a predetermined length of time, both of those contacts will open and thereby prevent further flow of current from the taps 68 and 72 to and through those contacts.

The numerals 78 and 86 denote controlled rectifiers; and, preferably, those controlled rectifiers are silicon controlled rectifiers. Those controlled rectifiers preferably will be mounted on the same heat sink so the temperature of one of those controlled rectifiers will not unduly exceed the temperature of the other of those controlled rectifiers. The contact 74 of the current-responsive switch connects the tap 68 directly to the cathode of the silicon controlled rectifier 78; and the contact 76 of that current responsive switch connects the tap 72 directly to the cathode of the silicon controlled rectifier 86. A capacitor 80 is connected in parallel with the anode-cathode circuit of the controlled rectifier 78; and a capacitor 90 is connected in parallel with the anode-cathode circuit of the controlled rectifier 86. Those capacitors bypass high-frequency voltages around the anode-cathode circuits of those controlled rectifiers; and thus protect those controlled rectifiers against injury due to high voltage surges. Also, those capacitors help prevent premature and erratic firing of those controlled rectifiers. A Zener diode 82 and a resistor 84 are connected in parallel with each other across the gate-cathode circuit of the controlled rectifier 78; and a Zener diode 92 and a resistor 94 are connected in parallel with each other across the gate-cathode circuit of the controlled rectifier 86. The anodes of the controlled rectifiers 78 and 86 are connected together by a junction 88.

THe numeral 96 denotes a fuse which is connected to the upper terminal to the secondary winding 66 of the transformer 60, and that fuse connects a parallel-connected diode 98 and capacitor 100 to that upper terminal. A parallel-connected diode 102 and capacitor 104 are connected to the lower terminal of the secondary winding 66 of the transformer 60; and the anodes of the diodes 98 and 102 are connected together by a junction 106. The capacitors 100 and 104 bypass high-frequency voltages around the diodes 98 and 102, and thus protect those diodes from injury due to high voltage surges.

The numeral 108 generally denotes a magnetic amplifier; and that magnetic amplifier has output windings 110 and 112 which have the lower terminals thereof connected by a junction 114. That magnetic amplifier has a one-turn feedback winding 116, has a multiturn control winding 118, has a multiturn bias winding 120, has a multiturn response winding 122, and has a multiturn start bias winding 124. The terminals of the response winding 122 are directly shorted, and hence that winding does not provide an electrical output. However, that winding does help provide a desired time constant for the magnetic amplifier 108. A resistor 126, a diode 128 and a junction 130 connect the upper terminal of the output winding 110 to the gate of the silicon controlled rectifier 86 and to the parallel-connected Zener diode 92 and resistor 94. A resistor 132, a diode 134 and a junction 136 connect the upper terminal of the output winding 112 to the gate of the controlled rectifier 78 and to the parallel-connected Zener diode 82 and resistor 84.

The numeral 138 denotes an inductor which has one terminal thereof connected to the anodes of the controlled rectifiers 78 and 86 by the junction 88. The other terminal of that inductor is connected to the output terminal 154, shown in FIG. 1B, by a junction 140, a conductor 142, the one-turn feedback winding 116 of the magnetic amplifier 108, a conductor 144, a meter shunt 146 in FIG. 1B, a conductor 148, and the secondary winding 150 of a Tesla coil which has a primary winding 152. The other output terminal 156 in FIG. 1B is connected directly to the center tap 70 of the secondary winding 66 of the transformer 60 in FIG. 1A by a conductor 158.

The numeral 160 denotes a capacitor which has the upper terminal thereof connected between the junction 88 and inductance 138 at the top of FIG. 1A, and which has the lower terminal thereof connected to the conductor 158. A diode 162 is connected in parallel with that capacitor, and has the cathode thereof connected to the conductor 158. The diode 162 acts as a flyback diode to enable energy, stored within the inductor 138 while the controlled rectifier 78 or the controlled rectifier 86 is conductive, to cause current to continue to flow when both of those controlled rectifiers are nonconductive. The capacitor 160 averages the voltage pulses applied to the flyback diode 162, and thus tends to protect that flyback diode, from high voltage surges.

The numerals 164 and 166 in FIG. 1B denote jacks which are connected to the opposite ends of the meter shunt 146; and those jacks can receiver the plug of recording equipment which can be used to record the values of the current flowing to the output terminals 154 and 156. A capacitor 168 and an ammeter 170 are connected in parallel across the meter shunt 146; and that capacitor will average the current values appearing on that meter. A voltmeter 172 is connected between the conductors 148 and 18 in FIG. 1B; and a capacitor 174 is connected in parallel with that voltmeter to average the voltages appearing on that voltmeter. The numerals 176 and 178 denote jacks which are connected to the upper and lower terminals of the voltmeter 172; and those jacks can receive the plugs of recording equipment which can be used to record the voltages developed across the output terminals 154 and 156.

A resistor 180 and a relay coil 182 are connected in series between the conductors 148 and 158 in FIG. 1B; and that relay coil controls relay contacts 184 which are shown in FIG. 1A immediately above the level of the output windings 110 and 112 of the magnetic amplifier 108. Those relay contacts are normally open, but they will respond to energization of the relay coil 182 to close. A resistor 186 and a capacitor 188 are connected in series between the conductors 148 and 158; and that resistor and capacitor are intended to bypass any high-frequency voltages that are applied to the output terminals 154 and 156—thereby tending to keep any such high-frequency voltages from affecting the one-turn feedback winding 116 or the controlled rectifiers 78 and 86. A resistor 190 and a capacitor 192 are connected in series between the conductors 148 and 158 by a junction 191; and that resistor and capacitor constitute an RC voltage divider. In addition, the capacitor 192 acts as a bypass capacitor for ripple voltages appearing across the output terminals 154 and 156.

A resistor 194, a resistor 196, and an adjustable resistor 198 are connected in series between the junctions 106 and 140 in FIG. 1A; and a junction 195 connects the adjacent terminals of the resistors 194 and 196. A capacitor 200 has the upper terminal thereof connected to the junction 195, and has the lower terminal thereof connected to the conductor 158; and that capacitor bypasses ripple voltages appearing between that junction and that conductor. A resistor 202 has the left-hand terminal thereof connected to the junction 195, and has the right-hand terminal thereof connected to the upper terminal of the control winding 118 and to the lower terminal of the bias winding 120 by a junction 223. That resistor acts as a voltage-dropping resistor.

A conductor 205 is connected to the upper terminal of bias winding 120; and that conductor extends to a resistor 204 in FIG. 1B. An adjustable resistor 206 is connected between the resistor 204 and a junction 208. A diode 210 has the cathode there of connected to the junction 208, and has the anode thereof connected to the cathode of a Zener diode 216 and to a junction 214 by a junction 212. The anode of the Zener diode 216 is connected to the junction 223 by junctions 218 and 220 and by a conductor 221. A capacitor 222 is connected between the junctions 208 and 218, and that capacitor will charge up to a voltage close to the voltage across the Zener diode 216.

The numerals 224, 226 and 228 denote the movable contacts of a triple pole, double through switch in FIG. 1B which has stationary contacts 230, 232, 234, 236, 238 and 240. A resistor 248, a junction 242, and a conductor 243 connect the movable contact 228 to the lower terminal of the control winding 118 of the magnetic amplifier 108; and an adjustable resistor 246, a resistor 244, that junction, and that conductor also connect the movable contact 226 to that lower terminal. A potentiometer 250 has the upper terminal thereof connected to the fixed contact 230 by a junction 252, and has the lower terminal thereof connected to the junction 214 by junctions 254 and 256. A potentiometer 258 has the upper terminal thereof connected to the junction 252, and has the lower terminal thereof connected to the junction 254. The movable contact of the potentiometer 250 is connected to the stationary contact 234, while the movable contact of the potentiometer 258 is connected to the stationary contact 238. A conductor 260 connects the junction 256 with the upper terminal of the start bias winding 124 of the magnetic amplifier 108 in FIG. 1A; and a conductor 262, a resistor 264 in FIG. 1B, and a diode 266 connect the lower terminal of that winding to the movable contact of a potentiometer 268. That potentiometer has the left-hand terminal thereof connected to the output terminal 156 by a junction 272 and a conductor 274, and a Zener diode 270 connects the junction 272 and a conductor 274, and a Zener diode 270 connects the junction 191 to the right-hand terminal of that potentiometer.

The numeral 276 in FIG. 1A denotes a transformer which has primary windings 278 and 280; and the jumpers 50 and 52 connect those primary windings in parallel—thereby enabling those windings to operate on 230 volt alternating current. By removing those jumpers and by inserting the jumper indicated by dotted lines in FIG. 1A, the primary windings 278 and 280 can be connected in series so the terminals 20 and 22 can be connected to a source of 460 volt alternating current. The secondary winding of the transformer 276 is denoted by the numeral 282; and the upper terminal of that secondary winding is connected to the upper terminal of the relay coil 58, and to the movable contact 284 of a double pole, triple throw switch 283 which includes a second movable contact 286 and stationary contacts 288, 290, 292, 294, 296 and 298. The numeral 300 denotes a "Panel Control" indicator lamp which is connected between the stationary contact 288 and he lower terminal of the secondary winding 282, the numeral 302 denotes an "off" indicator lamp which is connected between the stationary contact 290 and that lower terminal, and the numeral 304 denotes a "Remote Control" indicator lamp which is connected between the stationary contact 292 and that lower terminal. The numeral 306 denotes a "High-Frequency" indicator lamp which has one terminal thereof connectable to the stationary contact 288 by a single pole, single throw switch 308; and the other terminal of that indicator lamp is connected to the lower terminal of the secondary winding 282. A junction 310 connects the stationary contact of the single pole, single throw switch 308 with the normally-open relay contacts 184; and a conductor 312 connects the right-hand relay contact 184 with the upper terminal of the primary winding 318 of a voltage stepup transformer 316 in FIG. 1B. A conductor 314 connects the lower terminal of the primary winding 318 with the lower terminal of the secondary winding 282 in FIG. 1A. The upper terminal of the high voltage secondary winding 320 of the transformer 316 in FIG. 1B is connected to an arc-gap terminal 322 and to the left-hand terminal of the primary winding 152 of the Tesla Coil; and the lower terminal of that high voltage secondary winding is connected to a spark gap terminal 324 by an adjustable resistor 326, and is connected to the right-hand terminal of the primary winding 152 of the Tesla coil by a capacitor 328.

The numerals 330 and 332 in the lower left-hand corner of FIG. 1A denote the movable contacts of a double pole, single throw, foot-operated switch 329 which includes stationary contacts 334 and 336. The numerals 368 and 370 denote the movable contacts of a double pole, single throw switch 373 which includes stationary contacts 372 and 374. The numerals 376 and 378 denote potentiometers; and the upper terminal of the former potentiometer is connected to the left-hand terminal of the latter potentiometer. Those potentiometers and the switch 373 are parts of a foot-operated control 367; and, when the pedal of that foot-operated control 367; and, when the pedal of that foot-operated control is actuated, that switch will close and then the movable contact of the potentiometer 376 will move. The movable contact of the potentiometer 378 will be set by means of a screwdriver, and will not be affected by actuation of the pedal of the foot-operated control 367.

The numerals 338 and 348 denote terminals which connect the movable contact 330 of switch 329 to a junction 360 that, in turn, is connected to the stationary contact 298 of switch 283. Terminals 380 and 400 connect the movable contact 368 of switch 373 to that same junction and stationary contact. Terminals 340 and 350 connect the stationary contact 334 of switch 329 to a junction 362, and thus to the lower terminal of the secondary winding 282 of transformer 276; and terminals 382 and 402 connect the stationary contact 372 of switch 373 to that junction and lower terminal. Terminals 342 and 352 connect the movable contact 332 of switch 329 to a junction 364 which is connected to the stationary contact 292 of switch 283; and terminals 384 and 404 connect the movable contact 370 of switch 373 to that same junction and stationary contact. Terminals 344 and 354 connect the stationary contact 336 of switch 329 to a junction 366, and thus to the junction 310, and terminals 386 and 406 connect the stationary contact 374 of switch 373 to those junctions. It will thus be apparent that the contacts of the switch 329 and the contacts of the switch 373 are connected in parallel. Terminals 388 and 408 connect the upper terminal of the potentiometer 376 and the left-hand terminal of the potentiometer 378 to the center tap 70 of the secondary winding 66 of the transformer 60; and a junction 381, terminals 394 and 414, and a conductor 422 connect the lower terminal of potentiometer 376 and the right-hand terminal of potentiometer 378 to the stationary contact 232 in FIG. 1B. Terminals 390 and 410 and a conductor 418 connect the movable contact of the potentiometer 378 to the stationary contact 240 in FIG. 1B; and terminals 392 and 412 and a conductor 420 connect the movable contact of the potentiometer 376 to the stationary contact 236 in FIG. 1B. Terminals 346 and 356 are connected to ground; and so are terminals 396 and 416. The terminals 348, 350, 352, 354 and 356 are parts of a female connector which is mounted on the housing of the electric welder; and the terminals 338, 340, 342, 344 and 346 are parts of a male connector 347 which can be plugged into that female connector. The terminals 400, 402, 404, 406, 408, 410, 412, 414 and 416 preferably are parts of a female connector which is mounted on the housing of the electric welder; and the terminals 380, 382, 384, 386, 388, 390, 392, 394 and 396 are parts of a male connector 397 which can be plugged into that female connector.

The numeral 423 in FIG. 2 generally denotes a remote control which can be used to perform the functions performed by the potentiometers 376 and 378 and the double pole, single throw switch 373 of the foot-operated control 367. That remote control includes a male connector 465 which has terminals 448, 450, 452, 454, 456, 458, 460, 462 and 464 that can mate with the terminals 400, 402, 404, 406, 408, 410,412, 414 and 416 shown in FIG. 1A. That remote control also includes a double pole, double throw switch 427 which includes movable contacts 424 and 426 and stationary contacts 428, 430 and 432. The stationary contact 428 is directly connected to the terminal 448, the movable contact 424 is connected to the movable contact 426 and also to the terminal 452 by an indicator lamp 438, and the stationary contact 432 is connected to that terminal by an indicator lamp 440. A single pole, single throw switch 434 has the movable contact thereof connected to the terminal 452 and has the stationary contact thereof connected directly to the terminal 454, and to the terminal 450 by an indicator lamp 436. A potentiometer 442 has the upper terminal thereof directly connected to the terminal 456, and has the lower terminal thereof connected to the terminal 462 by a junction 446; and a potentiometer 444 is connected in parallel with that potentiometer. The movable contact of the potentiometer 444 is connected to the terminal 458, and the movable contact of the potentiometer 442 is connected to the terminal 460. The terminal 464 is grounded.

The potentiometer 250, which is mounted within the housing of the electric welder, and the potentiometer 442, which is located within the remote control 423, provide coarse adjustments of the welding currents supplied to the output terminals 154 and 156; and those potentiometers will preferably be equipped with knobs which bear numerals and markings covering a range of welding current from zero through 50 amperes. The knob for the potentiometer 250 will be located at the exterior of the housing for the electric welder, and the knob for the potentiometer 442 will be located at the exterior of the remote control 423. The potentiometer 258, which is mounted within the housing of the electric welder, and the potentiometer 444, which is located within the remote control 423, provide fine adjustments of the welding currents supplied to the output terminals 154 and 156; and those potentiometers will preferably be equipped with knobs which bear numerals and markings representing increases or decreases from the coarse current level settings provided by the potentiometers 250 and 442. The knob for the potentiometer 258 will be located at the exterior of the housing for the electric welder, and the knob for the potentiometer 444 will be located at the exterior of the remote control 423. In the preferred embodiment of electric welder provided by the present invention the knobs for the potentiometers 250 and 442 bear the numerals 0, 5, 10, 15, 20, 25, 30, 35, 40, 45 and 50 plus radially-directed lines representing the five current values between adjacent numerals; and the knobs for the potentiometers 258 and 444 bear the numerals 1 through 10 and the notation "-decrease" at the left-hand side thereof and bear the numerals 1 through 10 and the notation "increase" at the right-hand side thereof. By appropriately setting the knobs for the potentiometers 250 and 258, or by appropriately setting the knobs for the potentiometers 442 and 444, the operator can cause the electric welder to supply any desired value of current between five-tenths of an ampere and 50 amperes—whether that value is a whole number a fraction, or a combination thereof.

Referring particularly to FIGS. 3—5, the numeral 470 denotes one of the magnetic cores of the magnetic amplifier 108; and that core is toroidal in configuration. The second magnetic core 472 of that magnetic amplifier also is toroidal in configuration; and those magnetic cores are coaxial and are immediately adjacent each other. The numeral 476 in FIG. 5 generally denotes the various multiturn windings 118, 120, 122 and 124 of the magnetic amplifier 108. A plate 474 of insulation is secured to an supported by the frame of the inductor 138, which is shown at the bottom of FIGS. 4 and 5 and the magnetic amplifier 108 is supported by that plate. Insulating tape 478 is wound onto the exterior of that magnetic amplifier to enable that exterior to approximate cylindrical form; and a resilient strip 480 of insulating material is bent around the exterior of that magnetic amplifier to assume a generally cylindrical form. The multiturn windings of the magnetic amplifier 108 have the ends thereof secured to lugs 482 which are fixedly secured to the strip 480; and the conductors 205, 221, 243, 260 and 262 of FIG. 1A will be appropriately connected to those lugs. A cushioning element 484 of resilient material is wound around the exterior of the strip 480 to constitute a resilient annulus; and a split-ring clamp 486 encircles that resilient annulus. A bolt and nut combination 487 facilitates tightening of the split-ring clamp 486 to fixedly secure the resilient annulus 484 to the strip 480.

The split-ring clamp 486 has feet 488 which are spaced-apart circumferentially, and which are suitably secured to the plate 474 of insulation to fixedly hold the magnetic amplifier 108 in position relative to that plate. A yieldable washer 490 is interposed between the confronting faces of the plate 474 of insulation and the magnetic amplifier 108, and a yieldable washer 492 abuts the opposite face of that magnetic amplifier. A stiff washer 494 of insulating material overlies the outer face of the resilient washer 494, and a sleeve 496 of insulation extends through the geometric center of the magnetic amplifier 108. That sleeve is aligned with a threaded opening in the plate 474 of insulation; and the one-turn winding 116 of the magnetic amplifier 108 is formed as a rod which is threaded at both ends and which has the left-hand end thereof threaded into and held by the threaded opening in the plate 474 of insulation. A washer 498 encircles the protruding portion of the left-hand end of that rod, and nuts 500 are tightly threaded onto that left-hand end. A connector on the end of the conductor 140 telescopes over the left-hand end of the rod 116 and is held tightly in intimate engagement with the nuts 500 by a nut 506. A washer 502 telescopes over the right-hand end of the rod 116 and abuts the outer face of the stiff washer 494 of insulating material; and nuts 504 hold the former washer in intimate engagement with the latter washer, and thus hold the magnetic amplifier 108 fixedly in position relative to the plate 474 of insulation. A connector on the end of the conductor 144 telescopes over the right-hand end of the bolt 116, and a nut 508 will hold that connector in intimate engagement with the nuts 504.

The power which the electric welder shown in FIGS. 1A and 1B can supply to an arc can be controlled by the potentiometers 250 and 258 in FIG. 1B, by the potentiometers 376 and 378 in FIG. 1A, or by the potentiometers 442 and 444 in FIG. 2. As pointed out hereinbefore, the potentiometers 250 and 258 of FIG. 1B are mounted within the housing of the electric welder, the potentiometers 376 and 378 of FIG. 1A are located in the foot-operated control 367, and the potentiometers 442 and 444 of FIG. 2 are located in the remote control 423. When the potentiometers 250 and 258 in FIG. 1B are to be used to control the power which the electric welder supplies to the arc, the movable contacts 284 and 286 of the switch 283 in FIG. 1A will be set in engagement, respectively, with the stationary contacts 288 and 294, and the movable contacts 224, 226 and 228 in FIG. 1B will be set in engagement, respectively, with the stationary contacts 230, 234 and 238. When the potentiometers 376 and 378 in FIG. 1A are to be used to control the power which the electric welder supplies to the arc, the movable contacts 284 and 286 of the switch 283 in FIG. 1A will be set in engagement, respectively, with the stationary contacts 292 and 298, and the movable contacts 224, 226 and 228 in FIG. 1B will be set in engagement, respectively, with the stationary contacts 232, 236, and 240. When the potentiometers 442 and 444 in FIG. 2 are to be used to control the power which the electric welder supplies to the arc, the male connector 397 will be separated from the female connector which has the terminals 400, 402, 404, 406, 408, 410, 412, 414 and 416 and the male connector 465 will be assembled with that female connector, the movable contacts 284 and 286 of the switch 283 in FIG. 1A will be set in engagement, respectively, with the stationary contacts 292 and 298, and the movable contact 224, 226 and 228 in FIG. 1B will be set in engagement, respectively, with the stationary contacts 232, 236 and 240. Whenever the potentiometers 250 and 258 of FIG. 1B are to be used to control the power which the electric welder supplies to the arc, the switch 283 or the foot-operated switch 329 will be used, whenever the potentiometers 376 and 378 of FIG. 1A are to be used to control the power which the electric welder supplies to the arc, the switch 373 in the foot-operated control 367 will be used, and whenever the potentiometers 442 and 444 in the remote control 423 are to be used to control the power which the electric welder supplies to the arc, the switch 427 in that remote control will be used.

ADJUSTMENT OF ELECTRIC WELDER

In adjusting the electric welder provided by the present invention, the operator must first connect the primary windings of the transformers 60 and 276 so they can tolerate the voltage applied to the terminals 20 and 22. Specifically, if the voltage to be applied to those terminals is 460 volts, the jumpers 46 and 48 will be removed and a jumper, shown by dotted lines, will be connected between the terminals 30 and 32 to connect the primary windings 62 and 64 of transformer 60 in series. Similarly, the jumpers 50 and 52 will be removed and a jumper, shown by dotted lines, will be connected between the terminals 38 and 40 to connect the primary windings 278 and 280 of transformer 276 in series. On the other hand, if the voltage to be applied to the terminals 20 and 22 is 230 volts, the jumpers 46, 48, 50 and 52 will be left in the positions shown by FIG. 1A to connect the primary windings 62 and 64 in parallel and to connect the primary windings 278 and 280 in parallel.

The operator must decide whether he wishes to control the electric welder by means of the potentiometers 250 and 258 which are mounted within the housing of the electric welder, by means of the 376 and 378 which are located within the foot-operated control 367, or by means of the potentiometers 442 and 444 which are located within the remote control 423; and he must then appropriately set the switch 283 in FIG. 1A and the movable contacts 224, 226 and 228 in FIG. 1B. For purposes of illustration it will be assumed that the operator wishes to control the electric welder by means of the potentiometers 250 and 258 which are mounted within the housing of the electric welder; and this means that when the operator wishes to cause current to flow in the secondary winding 66 of the transformer 60, he will set the switch 283 and the movable contacts 224, 226 and 228 in their upper positions. However, until he wishes to cause current to flow in the secondary winding 66, the operator will leave that switch and those movable contacts in their intermediate positions. At such time the transformer 276 will, if the terminals 20 and 22 are connected to a suitable source of alternating current, illuminate the "off" indicator lamp 302 by causing current to flow from the upper terminal to the secondary winding 282 thereof via contacts 284 and 290 and indicator lamp 302 to the lower terminal of that secondary winding.

The secondary winding 66 of the transformer 60 develops a voltage of about 73 volts between the center tap 70 and the upper and lower terminals thereof; and the capacitor 200, and to a lesser extent the capacitor 188 and 192, respond to that voltage to make the voltage across the output terminals 154 and 156 about 90 volts prior to the time of an arc is initiated. The voltage across the output terminals 154 and 156 will drop after an arc has been initiated; but the secondary winding 66 and the capacitor 200 will cause a minimum value of current to flow through the conductor 148 in FIG. 1B whenever the terminals 20 and 22 are connected to a suitable source of alternating current and the relay contacts 54 and 56 are closed and a low impedance load is connected across the output terminals 154 and 156—that current flowing from the center tap 70 of the secondary winding 66 of transformer 60 via conductor 158, output terminal 156, the low impedance load, output terminal 154, the secondary winding 150 of the Tesla coil, conductor 148, meter shunt 146, conductor 144, single-turn winding 116 in FIG. 1A, conductor 142 junction 140, adjustable resistor 198, resistor 196, junction 195 and resistor 194 to the junction 106, and then through diode 98 and fuse 96 to the upper terminal of the secondary winding or through diode 102 to the lower terminal of that secondary winding. To close the relay contacts 54 and 56 the switch 283 in FIG. 1A will be set in its upper position to cause current to flow from the upper terminal of the secondary winding 282 of transformer 276 via relay coil 58 and contacts 286 and 294 to the lower terminal of that secondary winding; and the resulting energization of that relay coil will close the relay contacts 54 and 56 and then hold those relay contacts closed. Current also will flow from the upper terminal to the secondary winding 282 of transformer 276 via contacts 284 and 288 and "Panel Control" indicator lamp 300 to the lower terminal of that secondary winding; and that lamp will indicate that the switch 283 has been set in its upper position.

To adjust the minimum value of current flowing in the conductor 148 in FIG. 1B, the operator will trip the normally-closed contacts 74 and 76 of the current-responsive switch—thereby disconnecting the controlled rectifiers 78 and 86 from the secondary winding 66 of the transformer 60. Also, a 12½ ohm resistor will be connected across the output terminals 154 and 156. Thereafter, the setting of the movable contact of the adjustable resistor 198, at the top of FIG. 1A, will be adjusted until the reading on the ammeter 170 in FIG. 1B is four-tenths of an ampere. Once the required setting of the adjustable resistor 198 has been made, the normally-closed contacts 74 and 76 of the current-responsive switch will be reclosed.

During the time the contacts 74 and 76 of the current-responsive switch were tripped, the cathodes of the controlled rectifiers 78 and 86 were disconnected from the secondary winding 66 of the transformer 60, and hence those controlled rectifiers were kept nonconductive. Also during that time, the output windings 110 and 112 of the magnetic amplifier 108 were disconnected from that secondary winding, and hence those output windings were unable to apply firing signals to the gates and cathodes of those controlled rectifiers. However, during that time, current did flow through the single-turn winding 116 and through the multiturn windings 118, 120, 122 and 124 of that magnetic amplifier. Specifically, current flowed from the center tap 70 of secondary winding 66 via conductor 158, relay coil 182 in FIG. 1B, resistor 180, conductor 148, meter shunt 146, conductor 144, single-turn winding 116 in FIG. 1A, conductor 142, junction 140, adjustable resistor 198, resistor 196, junction 195, and resistor 194 to the junction 106, and then through diode 98 and fuse 96 to the upper terminal of that secondary winding or through diode 102 to the lower terminal of that secondary winding. The resulting energization of that relay coil closed the relay contacts 184; but the closing of those relay contacts was not significant at that time because the single pole, single throw switch 308 was open. Current also flowed from center tap 70 of secondary winding 66 via conductor 158, conductor 274 in FIG. 1B, junction 272, potentiometer 268, Zener diode 270, junction 191, resistor 190, conductor 148, meter shunt 146, conductor 144, single-turn winding 116 in FIG. 1A, conductor 142, junction 140, adjustable resistor 198, resistor 196, junction 195, and resistor 194 to the junction 106, and then through diode 98 and fuse 96 to the upper terminal of that secondary winding of through diode 102 to the lower terminal of the secondary winding. Further current flowed from the center tap 70 of secondary winding 66 via conductor 158, conductor 274 in FIG. 1B, junctions 272, 214, and 212, Zener diode 216, junctions 218 and 220, conductor 221, junction 223 in FIG. 1A, resistor 202, junction 195, and resistor 194 to the junction 106, and then through diode 98 and fuse 96 to the upper terminal of that secondary winding or through diode 102 to the lower terminal of that secondary winding. Further current flowed from the center tap 70 of secondary winding 66 via conductor 158, conductor 274 in FIG. 1B, junctions 272, 214, 256 and 254, parallel-connected potentiometers 250 and 258 to junction 252, stationary and movable contacts 230 and 224, junction 220, conductor 221, junction 223 in FIG. 1A, resistor 202, junction 195, and resistor 194 to the junction 106, and then through diode 98 and fuse 96 to the upper terminal of that secondary winding or through diode 102 to the lower terminal of that secondary winding. Still further current flowed from the center tap 70 of secondary winding 66 via conductor 158, conductor 274 in FIG. 1B, junctions 272, 214 and 212, diode 210, junction 208, adjustable resistor 206, resistor 204, conductor 205, bias winding 120 in FIG. 1A, junction 223, resistor 202, junction 195, and resistor 194 to the junction 106, and then through diode 98 and fuse 96 to the upper terminal of that secondary winding or through diode 102 to the lower terminal of that secondary winding. The flow of current through the Zener diode 270 developed a voltage of about 39 volts across that Zener diode, and a voltage of about 12 volts developed across the resistor 190 while a voltage of about 39 volts developed across the potentiometer 268. The voltage between the movable contact and the left-hand terminal of the potentiometer 268 caused current to flow from junction 272 via junctions 214 and 256, conductor 260, the start-bias winding 124 in FIG. 1A, conductor 262, resistor 264 in FIG. 1B, and diode 266 to that movable contact. The resulting flow of current through that start-bias winding tended to limit the amount of current which could flow through the output windings 110 and 112 of the magnetic amplifier 108 to a low value. The amount of current flowing through that start-bias winding will be controlled by the setting of the movable contact of the potentiometer 268.

The flow of current through the Zener diode 216 developed a voltage of about 20 volts across that Zener diode, and that same voltage appeared across both of the potentiometers 250 and 258. The voltage between the junction 254 and the movable contact of potentiometer 258 caused current to flow from that movable contact via fixed and movable contacts 238 and 228, resistor 248, junction 242, conductor 243, control winding 118 in FIG. 1A, junction 223, resistor 202, junction 195, and resistor 194 to the junction 106, and then through diode 98 and fuse 96 to the upper terminal of the secondary winding 66 of the transformer 60 or through diode 102 to the lower terminal of that secondary winding. The voltage between the junction 254 and the movable contact of the potentiometer 250 caused current to flow from that movable contact via fixed and movable contacts 234 and 226, adjustable resistor 246, resistor 244, junction 242, conductor 243, control winding 118 in FIG. 1A, junction 223, resistor 202, junction 195, and resistor 194 to the junction 106, and then through diode 98 and fuse 96 to the upper terminal of the secondary winding 66 of transformer 60 or through diode 102 to the lower terminal of that secondary winding. The value of the current flowing through that control winding will be determined by the settings of the movable contact of the adjustable resistor 246 and of the movable contacts of the potentiometers 250 and 258. Current also flowed from junction 272 via junctions 214 and 212, diode 210, junction 208, adjustable resistor 206, resistor 204, conductor 205, bias winding 120 in FIG. 1A, junction 223, resistor 202, junction 195, and resistor 194 to the junction 106, and then through diode 98 and fuse 96 to the upper terminal of the secondary winding 66 of transformer 60 or through diode 102 to the lower terminal of that secondary winding. The value of the current flowing through that bias winding will be controlled by the setting of the movable contact of adjustable resistor 206.

Current flowed through the response winding 122 of the magnetic amplifier 108, but the output terminals of that winding are directly "shorted." As a result, the winding did not provide an electrical output; but the magnetic flux lines which it developed helped provide the desired time constant for the magnetic amplifier 108. The current flowing through the control winding 118 of that magnetic amplifier tended to cause the output windings 110 and 112 to supply firing signals to the controlled rectifiers 78 and 86; but, because the contacts 74 and 76 of the current-responsive switch were open, no current could flow through those output windings and those output windings could not supply firing signals to those controlled rectifiers.

When the contacts 74 and 76 of the current-responsive switch were reclosed, the cathodes of the controlled rectifiers 78 and 86 were reconnected, respectively, to the taps 68 and 72 of the secondary winding 66 of the transformer 60; and the output windings 110 and 112 also were reconnected to those taps. Thereupon, during those half-cycles of the alternating current applied to the terminals 20 and 22 wherein the center tap 70 was positive relative to the tap 72, current flowed from that center tap via junction 114, output winding 110, resistor 126, diode 128, junction 130, parallel-connected Zener diode 92 and resistor 94 and the gate-cathode circuit of controlled rectifier 86, and contact 76 to the tap 72; and, during those half-cycles of the alternating current applied to the terminals 20 and 22 wherein the center tap 70 was positive relative to the tap 68, current flowed from that center tap via junction 114, output winding 112, resistor 132, diode 134, junction 136, parallel-connected Zener diode 82 and resistor 84 and the gate-cathode circuit of controlled rectifier 78, and contact 74 to the tap 68. The Zener diodes 82 and 92 and the resistors 84 and 94 caused voltage drops of about 9 1/10 volts to develop across the gate-cathode circuit of each of the controlled rectifiers 78 and 86; and those voltage drops were large enough to cause sufficient current to flow through those gate-cathode circuits to render those controlled rectifiers conductive, but were small enough to protect those gate-cathode circuits from injury. Consequently, during each subsequent cycle of the alternating current applied to the terminals 20 and 22, current will flow from the center tap 70 of the secondary winding 66 of the transformer 60 via conductor 158, output terminal 156, the 12½ohm resistor, output terminal 154, the secondary winding 150 of the Tesla coil, conductor 148, meter shunt 146, conductor 144, the one turn winding 116 in FIG. 1A, conductor 142, junction 140, and inductor 138 to the junction 88, and then through controlled rectifier 78 and contact 74 to the tap 68 or through controlled rectifier 86 and contact 76 to the tap 72. The resulting flow of current through the meter shunt 146 will increase the reading on the ammeter 170 to a value greater than four-tenths of an ampere.

At this time, the 12½ohm resistor will still be connected across the output terminals 154 and 156, the switch 283 will still be in its uppermost position, and the switch 308 will still be open; and the operator will set the knob of the potentiometer 258 in its middle or "calibrate" position, and will set the knob of the potentiometer 250 in its full counterclockwise position. The operator will then adjust the setting of the movable contact of the adjustable resistor 206 until the reading on the ammeter 170 is five-tenths of an ampere. At such time, the secondary winding 66 of the transformer 60 will coact with the diodes 98 and 102, the resistors 194 and 196, and the adjustable resistor 198 to supply four-tenths of an ampere to the 12½ ohm resistor connected across the output terminals 154 and 156; and the portions of that secondary winding intermediate the taps 68 and 72 will coact with the controlled rectifiers 78 and 86, the diodes 128 and 134, and the resistors 126 and 132 to supply one-tenth of an ampere to that resistor.

The 12½ohm resistor will then be disconnected from the output terminals 154 and 156, and a one-quarter of an ohm resistor will be connected across those output terminals. Thereupon, the knob of the potentiometer 250 will be rotated to its full clockwise position, and the setting of the movable contact of the adjustable resistor 246 will be adjusted until the reading on the ammeter 170 is fifty amperes.

The setting of the movable contact of the adjustable resistor 206 affects the amount of current flowing through the bias winding 120, and the setting of the movable contact of the adjustable resistor 246 affects the amount of current flowing through the control winding 118; and the currents flowing through both of those control windings affect the amounts of current flowing through the output windings 110 and 112 of the magnetic amplifier 108. As a result, the settings of the movable contacts of the adjustable resistors 206 and 246 must be checked and rechecked several times; until the reading on the ammeter 170 is always one-half of an ampere when the knob of the potentiometer 250 is in its full counterclockwise position and a 12½ohm resistor is connected across the output terminals 154 and 156, and the reading on that ammeter is always 50 amperes whenever the knob of the potentiometer 250 is in its full clockwise position and a one-quarter ohm resistor is connected across those output terminals.

Once the operator has appropriately set the movable contacts of the adjustable resistors 206 and 246 to provide the five-tenths of an ampere lower current limit and the 50 ampere upper current limit of the operating range of the electric welder, he will connect a jumper across the output terminals 154 and 156 to simulate the essentially-zero ohm load constituted by an arc. At such time, he will set the knob of the potentiometer 250 to the numeric value on that knob which most closely approximates the desired welding current level. If the reading on the ammeter 170 is at the desired welding level, he will enter that fact and the numeric value on that knob in an appropriate record book. However, it will usually be necessary for the operator to rotate the knob of the potentiometer 258 to attain a reading on the ammeter 170 which precisely equals the desired welding current level. Because the movable contact of the latter potentiometer was previously set in its middle position, the operator can rotate that knob in the increase or decrease direction to increase or decrease the reading on the ammeter 170. When the meter reading equals the desired welding current level, the operator will enter that welding current level, the numeric value on the knob of potentiometer 250, and the increase or decrease numeric value on the knob of potentiometer 258 in the record book.

The operator will repeat the record-entering procedure for each of the various welding current levels which he may wish to use. Subsequently, whenever he wishes to weld at one of those welding current levels, he need only refer to the record book, set the knobs of the potentiometers 250 and 258 at the values recorded in that book, connect the output terminals 154 and 156, respectively, to the electrode and to the workpiece, initiate an arc, and then start to weld. The values of welding current selected by the operator can include fractional values and complex values as well as whole values; and the operator can set any value of welding current that he desires between the one-half ampere lower current limit and the 50 ampere upper current limit provided by the electric welder. The use of the two potentiometers 250 and 258 not only enables the operator to select any desired value of welding current between the one-half ampere lower current limit and the 50 ampere upper current limit provided by the electric welder, but it also obviates all need of a costly ten-turn helipot.

If the operator plans to use the foot-operated control 367, he will repeat the calibration procedure described hereinbefore in connection with the potentiometers 250 and 258 and the adjustable resistors 206 and 246—the potentiometers 250 and 258 and the adjustable resistors 376 corresponding to the potentiometer 250, and the potentiometer 378 corresponding to the potentiometer 258. Where the foot-operated control 367 is used, currents will flow through the bias winding 120 and through the bias-start winding 124 of the magnetic amplifier 108 in the manner described hereinbefore; but the currents flowing through the control winding 118 will flow in a different manner. Specifically, current will flow from center tap 70 of the secondary winding 66 of transformer 60 via conductor 158, terminal 408, terminal 388, the upper section and movable contact of potentiometer 376, terminal 392, terminal 412, conductor 420, fixed and movable contacts 236 and 226 in FIG. 1B, adjustable resistor 246, resistor 244, junction 242, conductor 243, control winding 118 in FIG. 1A, junction 223, resistor 202, junction 195, and resistor 194 to the junction 106, and then through diode 98 and fuse 96 to the upper terminal of that secondary winding or through diode 102 to the lower terminal of that secondary winding. Current also will flow from the center tap 70 of the secondary winding 66 of transformer 60 via conductor 158, terminal 408, terminal 388, the left-hand section and movable contact of potentiometer 378, terminal 390, terminal 410, conductor 418, fixed and movable contacts 240 and 228, resistor 248, junction 242, conductor 243, control winding 118 in FIG. 1A, junction 223, resistor 202, junction 195, and resistor 194 to the junction 106, and then through diode 98 and fuse 96 to the upper terminal of that secondary winding or through diode 102 to the lower terminal of that secondary winding. The movable contact of the potentiometer 378 is moved by actuating the pedal of the foot-operated control 367, but the movable contact of the potentiometer 376 must be adjusted with a screwdriver.

If the operator plans to use the remote control 423, he will disconnect the male connector 397 and will plug the male connector 465 into the female connector which includes the terminals 400, 402, 404, 406, 408, 410, 412, 414 and 416. Thereafter, he will repeat the calibration procedure described hereinbefore in connection with the potentiometers 250 and 258 and the adjustable resistors 206 and 246—the potentiometer 442 corresponding to the potentiometer 250, the potentiometer 444 corresponding to the potentiometer 258. Where the remote control 423 is used, currents will flow through the bias winding 120 and through the bias-start winding 124 of the magnetic amplifier 108 in the manner described hereinbefore; but the currents flowing through the control winding 118 will flow in a different manner. Specifically, current will flow from center tap 70 of the secondary winding 66 of transformer 60 via conductor 158, terminal 408, terminal 456 in FIG. 2, the upper section and movable contact of potentiometer 442, terminal 460, terminal 412 in FIG. 1A, conductor 420, fixed and movable contacts 236 and 226 in FIG. 1B, adjustable resistor 246, resistor 244, junction 242, conductor 243, control winding 118 in FIG. 1A, junction 223, resistor 202, junction 195, and resistor 194 to the junction 106, and then trough diode 98 and fuse 96 to the upper terminal of that secondary winding or through diode 102 to the lower terminal of that secondary winding. Current also will flow from center tap 70 of the secondary winding 66 of transformer 60 via conductor 158, terminal 408, terminal 456 in FIG. 2, the left-hand section and movable contact of potentiometer 444, terminal 458, terminal 410 in FIG. 1A, conductor 418, fixed and movable contacts 240 and 228, resistor 248, junction 242, conductor 243, control winding 118 in FIG. 1A, junction 223, resistor 202, junction 195, and resistor 194 to the junction 106, and then through diode 98 and fuse 96 to the upper terminal of that secondary winding or through diode 102 to the lower terminal of that secondary winding. The remote control 423 does not have a Zener diode connected in parallel with the parallel-connected potentiometers 442 and 444; but, if desired, a Zener diode could be so connected.

Once these various adjustments have been made, a sample piece of metal which is identical, in composition and thickness to the workpieces which are to be welded by the electric welder will be connected to the output terminal 156, and an electrode will be connected to the output terminal 154. Thereafter, the switch 283 will be recurrently shifted between its uppermost and intermediate portions to initiate and extinguish arcs between that electrode and that sample piece of metal; and the setting of the movable contact of the adjustable resistor 326 will be adjusted to enable that adjustable resistor, the transformer 316, the spark gap defined by the spark gap terminals 322 and 324, the capacitor 328, and the Tesla coil to develop high-frequency voltages which will facilitate the prompt and full establishment of arcs between the electrode and the sample piece of metal. After a number of arcs have been initiated and extinguished, the sample piece of metal will be carefully inspected to determine the effects which the initiation of arcs have upon it. If the energy in the arcs, at the time those arcs are initiated, is great enough to pit, perforate or melt the sample piece of metal, the movable contact of the potentiometer 268 will be adjusted to change the value of current flowing through the start-bias winding 124 until the energy in the arcs, at the time those arcs are initiated, will be too small to pit, perforate or melt the sample piece of metal.

OPERATION OF ELECTRIC WELDER

Where the welding current levels are to be controlled by the potentiometers 250 and 258, the movable contacts 224, 226 and 228 will be set in engagement, respectively, with the fixed contacts 230, 234 and 238; and power can be supplied to the relay coil 58 and to the step-up transformer 316 by closing switch 308 and by setting switch 283 in its uppermost position, or by setting switch 283 in its lowermost position and closing the foot-operated switch 329. Where the switch 308 is closed and the switch 283 is set in its uppermost position, current will flow from the upper terminal of secondary winding 282 of transformer 276 via relay coil 58 and movable and fixed contacts 286 and 294 to the lower terminal of that secondary winding; and current also will flow from the upper terminal of that secondary winding via movable and fixed contacts 284 and 288, switch 308, junction 310, relay contacts 184, conductor 312, primary winding 318 of transformer 316 in FIG. 1B, and conductor 314 to the lower terminal of that secondary winding. Further current will flow from the upper terminal of secondary winding 282 via movable and fixed contacts 284 and 288 and "Panel Control" indicator lamp 300 to the lower terminal of that secondary winding; while additional current will flow from the upper terminal to that secondary winding via movable and fixed contacts 284 and 288, switch 308, and "High Frequency" indicator lamp 306 to the lower terminal of that secondary winding. The flow of current through relay coil 58 will close relay contacts 54 and 56, and thus will cause power to be supplied to the transformer 60; and the flow of current through the primary winding 318 of transformer 316 will cause the Tesla coil to develop high-frequency voltages between the electrode and a work-piece, and those high-frequency voltages will help initiate and establish an arc.

Where the switch 283 is set in its lowermost position and the foot-operated switch 329 is closed, current will flow from the upper terminal of secondary winding 282 of transformer 276 via relay coil 58 and movable and fixed contacts 286 and 298, junction 360, terminals 348 and 338, contacts 330 and 334, terminals 340 and 350, and junction 362 to the lower terminal of that secondary winding; and current also will flow from the upper terminal of that secondary winding via movable and fixed contacts 284 and 292, junction 364, terminals 352 and 342, contacts 332 and 336, terminals 344 and 354, junctions 366 and 310, relay contacts 184, conductor 312, primary winding 318 of transformer 316 in FIG. 1B, and conductor 314 to the lower terminal of that secondary winding. Further current will flow from the upper terminal of secondary winding 282 via movable and fixed contacts 284 and 292 and "Remote Control" indicator lamp 304 to the lower terminal of that secondary winding; while additional current will flow from the upper terminal of that secondary winding via movable and fixed contacts 284 and 292, junction 364, terminals 352 and 342, contacts 332 and 336, terminals 344 and 354, junctions 366 and 310, and "High Frequency" indicator lamp 306 to the lower terminal of that secondary winding.

This means that the operator of the electric welder provided by the present invention can use the potentiometers 250 and 258 to set the desired welding current level, and can then use the switch 283 or the foot-operated switch 329 to initiate and extinguish the arcs. In the former case the "Panel Control" indicator lamp 300 will be illuminated, whereas in the latter case the "Remote Control" indicator lamp 306 will be illuminated. In both cases, the "High-Frequency" indicator lamp 306 will be illuminated.

Where the welding current levels are to be controlled by the potentiometers 376 and 378 in the foot-operated control 367, the movable contacts 224, 226 and 228 will be set in engagement, respectively, with the fixed contacts 232, 236 and 240 and the switch 283 will be set in its lowermost position. Current will flow from the upper terminal of secondary winding 282 of transformer 276 via relay coil 58 and movable and fixed contacts 286 and 298, junction 360, terminals 400 and 380, contacts 368 and 372, terminals 382 and 402, and junction 362 to the lower terminal of that secondary winding; and current also will flow from the upper terminal of that secondary winding via movable and fixed contacts 284 and 292, junction 364, terminals 404 and 384, contacts 370 and 374, terminals 386 and 406, junctions 366 and 310, relay contact 184, conductor 312, primary winding 318 of transformer 316 in FIG. 1B, and conductor 314 to the lower terminal of that secondary winding. Further current will flow from the upper terminal of secondary winding 282 via movable and fixed contacts 284 and 292 and "Remote Control" indicator lamp 304 to the lower terminal of that secondary winding; while additional current will flow from the upper terminal of that secondary winding via movable and fired contacts 284 and 292, junction 364, terminals 404 and 384, contacts 370 and 374, terminals 386 and 406, junctions 366 and 310, and "High-Frequency" indicator lamp 306 to the lower terminal of that secondary winding. The flow of current through relay coil 58 will close relay contacts 54 and 56, and thus will cause power to be supplied to the transformer 60; and the flow of current through the primary winding 318 of transformer 316 will cause the Tesla coil to develop high-frequency voltages between the electrode and a workpiece, and those high-frequency voltages will help initiate and establish an arc.

Where the welding current levels are to be controlled by the potentiometers 442 and 444 in the remote control 423, the movable contacts 224, 226 and 228 will be set in engagement, respectively, with the fixed contacts 232, 236 and 240 and the switch 283 will be set in its lowermost position. Current will flow from the upper terminal of secondary winding 282 of transformer 276 via relay coil 58 and movable and fixed contacts 286 and 298, junction 360, terminal 400, terminal 448 in FIG. 2, contacts 428 and 424, terminal 450, terminal 402 in FIG. 1A, and junction 362 to the lower terminal of that secondary winding; and current also will flow from the upper terminal of that secondary winding via movable and fixed contacts 284 and 292, junction 364, terminal 404, terminal 452 in FIG. 2, switch 434, terminal 454, terminal 406 in FIG. 1A, junctions 366 and 310, relay contacts 184, conductor 312 primary winding 318 of transformer 316 in FIG. 1B, and conductor 314 to the lower terminal of that secondary winding.

Further current will flow from the upper terminal of secondary winding 282 of transformer 276 via movable and fixed contacts 284 and 292, junction 364, terminal 404, terminal 452 in FIG. 2, switch 434, indicator lamp 436, terminal 450, terminal 402 in FIG. 1A, and junction 362 to the lower terminal of that secondary winding; and additional current will flow from the upper terminal of that secondary winding via movable and fixed contacts 284 and 292, junction 364, terminal 404, terminal 452 in FIG. 2, indicator lamp 438, contacts 430 and 426, terminal 450, terminal 402 in FIG. 1A, and junction 362 to the lower terminal of that secondary winding. The flow of current through relay coil 58 will close relay contacts 54 and 56, and thus will cause power to be supplied to the transformer 60; and the flow of current through the primary winding 318 of transformer 316 will cause the Tesla coil to develop high-frequency voltages between the electrode and a workpiece, and those high frequency voltages will help initiate and establish an arc. The indicator lamps 436 and 438 will indicate that the relay coil 58 is energized and that the circuit to the relay contacts 184 has been completed.

The operator can selectively connect the relay contacts 184 to, and can disconnect those relay contacts from, the secondary winding 282 by closing and opening the switch 434 in the remote control 423; and he can selectively connect the relay coil 58 to, and can disconnect that relay coil from, the secondary winding 282 by closing and opening the switch 424. In addition, he can adjust the welding current level by rotating the knobs of the potentiometers 442 and 444. As a result, the operator can provide full control of the electric welder by appropriate use of the remote control 423.

If the operator wishes to do so, he can use the foot-operated switch 329 in lieu of the switch 434 and the contacts 424 and 428 in the remote control 423. Specifically, if that operator opens the switch 434 and opens the contact 424, the contacts 332 and 336 in the foot-operated switch 329 will perform the function of the switch 434, and the contacts 330 and 334 in that foot-operated switch will perform the function of the contacts 424 and 428. As the switch 434 is opened, the indicator lamp 436 will be extinguished, but when the foot-operated switch 329 is closed it will illuminate indicator lamp 306. As contact 424 in the remote control 423 is opened, the contact 426 will move downwardly and extinguish the indicator lamp 438; but it will then illuminate the indicator lamp 440. The latter indicator lamp will indicate that the welding current level is controlled by the potentiometers 442 and 444 but that the relay coil 58 and the high-frequency voltages are controlled by the foot-operated switch 329.

For purposes of illustration, it will be assumed that the operator wishes to use the potentiometers 250 and 258 to control the welding current levels, and that he wishes to use the foot-operated switch 329 to control the relay coil 58 and the high-frequency voltages. That operator will then shift the switch 283 into its lowermost position, he will shift the movable contacts 224, 226 and 228 into their upper positions, and he will close the switch 308. As the switch 283 is shifted into its lowermost position, the "Remote Control" indicator lamp 304 will become illuminated. When the operator subsequently closes the foot-operated switch 329, that switch will energize the relay coil 58, will supply current to the primary winding 318 of the step-up transformer 316 and will illuminate the "-High-Frequency" indicator lamp 306—current flowing from the upper terminal of secondary winding 282 of transformer 276 via relay coil 58, movable and fixed contacts 286 and 298, junction 360, terminals 348 and 338, contacts 330 and 334, terminals 340 and 350, and junction 362 to the lower terminal of that secondary winding, further current flowing from that upper terminal via movable and fixed contacts 284 and 292, junction 364, terminals 352 and 342, contacts 332 and 336, terminals 344 and 354, junctions 266 and 310, relay contacts 184, conductor 312, primary winding 318 in FIG. 1B, and conductor 314 to the lower terminal of that secondary winding, and additional current flowing from that upper terminal via movable and fixed contacts 284 and 292, junction 364, terminals 352 and 342, contacts 332 and 336, terminals 344 and 354, junctions 366 and 310, and "High-Frequency" indicator lamp 306 to the lower terminal of that secondary winding.

The relay contacts 54 and 56 will close as the relay coil 58 becomes energized; and the secondary winding 66 of the transformer 60 will coact with the diodes 98 and 102 and capacitor 200 to establish a DC voltage of about 90 volts across the output terminals 154 and 156, will cause current to flow through the relay coil 182 to close the relay contacts 184, will cause current to flow through the bias winding 120 to set the normal operating level of the magnetic amplifier 108, will cause current to flow through the control winding 118 to tend to cause that magnetic amplifier to supply the firing angles called for by the settings of the potentiometers 250 and 258, and will cause current to flow through the start-bias winding 124 to limit the energy in the arc, as that arc is initiated, to levels which will not cause pitting, perforating or melting of the workpiece. Specifically, current will flow from the center tap 70 of secondary winding 66 via conductor 158, relay coil 182 in FIG. 1B, resistor 180, conductor 148, meter shunt 146, conductor 144, winding 116 in FIG. 1A, conductor 142, junction 140, adjustable resistor 198, resistor 196, junction 195 and resistor 194 to the junction 106, and then either through diode 98 and fuse 96 to the upper terminal of that secondary winding or through diode 102 to the lower terminal of that secondary winding; and current also will flow from that center tap of secondary winding 66 via conductor 158, conductor 274 in FIG. 1B, junctions 272, 214 and 212, diode 210, junction 208, adjustable resistor 206, resistor 204, conductor 205, bias winding 120 in FIG. 1A, junction 223, resistor 202, junction 195 and resistor 194 to the junction 106, and then either through diode 98 and fuse 96 to the upper terminal of that secondary winding or through the diode 102 to the lower terminal of that secondary winding. Further current will flow from the center tap 70 of secondary winding 66 via conductor 158, conductor 274 in FIG. 1B, junctions 272, 214, 256 and 254, the lower section and movable contact of potentiometer 258, contacts 238 and 228, resistor 248, junction 242, conductor 243, control winding 118, junction 223, resistor 202, junction 195 and resistor 194 to the junction 106, and then either through diode 98 and fuse 96 to the upper terminal of that secondary winding or through the diode 102 to the lower terminal of that secondary winding; and still further current will flow from that center tap of that secondary winding via conductor 158, conductor 274 in FIG. 1B, junctions 272, 214, 256 and 254, the lower section and movable contact of potentiometer 250, contacts 234 and 226, adjustable resistor 246, resistor 244, junction 242, conductor 243, control winding 118, junction 223, resistor 202, junction 195 and resistor 194 to the junction 106, and then either through diode 98 and fuse 96 to the upper terminal of that secondary winding or through diode 102 to the lower terminal of that secondary winding. In addition, current will flow from the center tap 70 of secondary winding 66 via conductor 158, conductor 274 in FIG. 1B, junctions 272, 214 and 256, conductor 260, the start-bias winding 124 in FIG. 1A, conductor 262, resistor 264 in FIG. 1B, diode 266, the movable contact and right-hand section of potentiometer 268, Zener diode 270, junction 191, resistor 190, conductor 148, meter shunt 146, conductor 144, winding 116 in FIG. 1A, conductor 142, junction 140, adjustable resistor 198, resistor 196, junction 195 and resistor 194 to the junction 106, and then either through diode 98 and fuse 96 to the upper terminal of that secondary winding or through diode 102 to the lower terminal of that secondary winding.

At this time, the transformer 316 will coact with adjustable resistor 326, air gap terminals 322 and 324, capacitor 328, and the windings 152 and 150 of the Tesla coil to apply high-frequency voltages to the electrode and workpiece, connected respectively, to the output terminals 154 and 156—that capacitor charging up, during each half-cycle of the alternating current supplied to the terminals 20 and 22, to the breakdown voltage of the air gap and then discharging through that air gap and the primary winding 152. The secondary winding 150 will apply those high-frequency voltages to the electrode and workpiece, and those high-frequency voltages will start ionizing the gas adjacent that electrode and workpiece. Also at this time, the magnetic amplifier 108 will respond to the currents flowing through the bias winding 120, the control winding 118, and the start-bias winding 124 to supply firing signals to the gate-cathode circuits of the controlled rectifiers 78 and 86; and those controlled rectifiers will supply sufficient current to the electrode and workpiece to initiate and establish an arc—current flowing from the center tap 70 of secondary winding 66 via conductor 158, output terminal 156 in FIG. 1B, the workpiece and the arc to the electrode, output terminal 154, secondary winding 150 of the Tesla coil, conductor 148, meter shunt 146, conductor 144, winding 116, conductor 142, junction 140, and inductor 138 to the junction 88, and then either through controlled rectifier 78 and contact 74 to the tap 68 or through the controlled rectifier 86 and contact 76 to the tap 72. The fact that the voltage between the electrode and workpiece is about 90 volts makes certain the initiation and establishment of the arc.

Once the arc has been established, the voltage between the electrode and workpiece—and thus between output terminals 154 and 156—will decrease sharply. That voltage will drop below the Zener voltage of Zener diode 270, and hence that Zener diode will essentially prevent further flow of current through start-bias winding 124. Thereupon, without any need of a relay or other contact-equipped device, the current-limiting effect which that start-bias winding provided will be eliminated; and magnetic amplifier 108 will start providing the firing angles, for controlled rectifiers 78 and 86, which are called for by potentiometers 250 and 258.

Also, as the voltage between the electrode and workpiece—and thus between output terminals 154 and 156—decrease sharply, the voltage across series-connected resistor 180 and relay coil 182 will decrease; and, very quickly, the current flowing through that relay coil will become too small to continue to hold relay contacts 184 closed. At such time those relay contacts will open to prevent further flow of current through primary winding 318 of transformer 316; and this will halt further application of the high-frequency voltages which are needed to help initiate the arc but which are not needed to maintain that arc. However, in the event the arc were to become extinguished, during the welding operation, the voltage across output terminals 154 and 156 would quickly rise to a level that was high enough to cause sufficient current to flow through relay coil 182 to reclose relay contacts 184—thereby causing stepup transformer 316 and the Tesla coil to develop high-frequency voltages between the electrode and the workpiece. The relay coil 182 has a finite energizing time, and that energizing time is long enough to keep relay contacts 184 from closing until after transients, which magnetic amplifier 108 develops at "turn on," have disappeared. As a result, those transients cannot cause the arcs to pit, perforate or melt the workpiece as those arcs are initiated.

Although the voltage across the output terminals 154 and 156 will decrease sharply, as the arc is established, the voltage across the Zener diode 216 will continue to equal the Zener voltage of that Zener diode; because the total voltage drop across resistors 194 and 202 will be very much less than the total voltage drop across resistors 194 and 196, adjustable resistor 198, and meter shunt 146. This means that the Zener diode 216 will continue to maintain a substantially fixed voltage across the parallel-connected potentiometers 250 and 258; and such a substantially fixed voltage is desirable, because the firing angles of the magnetic amplifier 108, and hence of the controlled rectifiers 78 and 86, will be determined by those potentiometers. Because the welding current level called for by the settings of the movable contacts of the potentiometers 250 and 258 will usually be higher than the current level permitted by the start-bias winding 124, the value of the welding current supplied to the output terminals 154 and 156 will usually increase after the voltage across those output terminals decreases to a level which makes the voltage across the Zener diode 270 less than the Zener voltage of the Zener diode. However, by that time, an arc has been initiated and is being maintained; and hence the increase in welding current level will not cause pitting or perforating of the workpiece.

The magnetic amplifier 108 will continue to supply the desired level of welding current to the output terminals 154 and 156 as long as the arc is maintained. If the current flowing through the arc tends to increase above the level called for by the settings of the movable contacts of the potentiometers 250 and 258, the increased ampere turns of the feedback winding 116 will make the magnetic amplifier 108 fire later in the half-cycles of the alternating current applied to the terminals 20 and 22, and thus will cause the controlled rectifiers 78 and 86 to fire later in those half-cycles. The reduced "on" times of those controlled rectifiers will cause the welding current level to decrease to the value called for by the settings of the movable contacts of the potentiometers 250 and 258. If, on the other hand, the current flowing through the arc tends to decrease below the level called for by the settings of the movable contacts of the potentiometers 250 and 258, the decreased ampere turns of the feedback winding 116 will make the magnetic amplifier 108 fire earlier in the half-cycles of the alternating current applied to the terminals 20 and 22, and thus will cause the controlled rectifiers 78 and 86 to fire earlier in those half-cycles. The increased "on" times of those controlled rectifiers will cause the welding current level to increase to the value called for by the settings of the movable contacts of the potentiometers 250 and 258.

The welding current level can be reset upwardly or downwardly at any time while the arc is being maintained, by merely adjusting the positions of either or both of the movable contacts of the potentiometers 250 and 258. The adjusting of the position of either of those movable contacts will change the ampere turns of the control winding 118, and will thus change the firing angle of the magnetic amplifier 108; and the change in that firing angle will produce a corresponding change in the firing angles of the controlled rectifiers 78 and 86.

To conclude a welding operation, the operator need only release the force that he was using to keep the foot-operated switch 329 closed; and, thereupon, the relay coil 58 will become deenergized to permit the relay contacts 54 and 56 to reopen, and the transformer 316 will be kept from becoming reenergized as the relay contacts 184 reclose. At the time the relay contacts 54 and 56 reopen the flux densities of the magnetic cores 470 and 472 of the magnetic amplifier 108 will be at given points on the hysteresis loops of those magnetic cores, and those flux densities will tend to remain at those points. It would be extremely undesirable to have the flux densities of those magnetic cores at those points on the hysteresis loops of those magnetic cores at the start of a succeeding welding operation; because those flux densities would tend to cause the magnetic amplifier 108 to have long "on" times—with corresponding long "on" times of the controlled rectifiers 78 and 86 and with consequent objectionably high energy levels in the arc as that arc was initiated and established. The present invention keeps the flux densities of the magnetic cores 470 and 472 of the magnetic amplifier 108 from remaining at the points on the hysteresis loops of those magnetic cores where they were at the conclusion of any give welding operation; and it does so by providing the capacitor 222 and the diode 210. That capacitor will, during each welding operation charge up to a value close to twenty volts, and it will remain charged to that value throughout that welding operation. However, at the end of each welding operation that capacitor will discharge; and, because the diode 210 will keep that capacitor from discharging through potentiometers 250 and 258 and control winding 118, that capacitor will discharge through the bias winding 120 in FIG. 1A—current flowing from the lower terminal of that capacitor via junction 208, adjustable resistor 206, resistor 204, conductor 205, that bias winding, junction 223, conductor 221, and junctions 220 and 218 in FIG. 1B to the upper terminal of that capacitor. That flow of current will drive the magnetic flux densities of the magnetic cores 470 and 472 of the magnetic amplifier 108 downwardly toward the bottoms of the hysteresis loops of those magnetic cores; and this extremely desirable because it will enable that magnetic amplifier to have very short "on" times—and thus cause the controlled rectifiers 78 and 86 to have extremely short "on" times —when the electric welder next initiates and establishes an arc. In the preferred embodiment of electric welder provided by the present invention, the capacitor 222, the diode 210 and the bias winding 120 drive the magnetic flux densities of the magnetic cores 470 and 472 of the magnetic amplifier 108 so far downwardly, at the end of each welding operation, that any succeeding welding operation can supply as little as one-half of an ampere to the arc as that arc is initiated and established. As a result, that embodiment of electric welder can avoid all pitting, perforating and melting of workpieces as it initiates and establishes an arc.

In the foregoing illustration of the operation of the electric welder of the present invention, the potentiometers 250 and 258 set the desired welding current levels and the foot-operated switch 329 determined the initiation and termination of each welding operation. The operation of that electric welder would be essentially the same if those potentiometers set those welding current levels but the switch 283 was used to determine the initiation and termination of each welding operation. The operation of that electric welder would be very similar if the potentiometers 442 and 444 of the remote control 423 were used to set the desired welding current levels and if the switch 434 and contacts 424 and 428 were used to determine the initiation and termination of each welding operation. In addition, the operation of the electric welder would be very similar if the potentiometers 442 and 444 of the remote control 423 were used to set the desired welding current levels but the foot-operated switch 329 was used to determine the initiation and termination of each welding operation. However, where the foot-operated control 367 is used to set the desired welding current levels and also to determine the initiation and termination of each welding operation, the operator must use more care; because the setting of the movable contact of the potentiometer 376 is fixed, and because there is no knob or other marked element to guide the operator in setting the position of the movable contact of the potentiometer 378. As a result, the foot-operated control 367 will be most useful on production line welding operations where a fixed coarse welding current level is desirable and where only relatively small deviations from that coarse welding current level are desired.

During the operation of the electric welder of the present invention, the upper and lower terminals of the secondary winding 66 of transformer 60 act as a voltage source, but they coact with the capacitor 200 to constitute a current source; and that current source causes a minimum value of substantially ripple-free direct current to flow in the conductor 148 in FIG. 1B whenever the electric welder is operating. In the preferred embodiment of the present invention, the at minimum flow of current is four-tenths of an ampere. The circuit which provides the minimum value of current in the conductor 148 in FIG. 1B is effectively in parallel with the circuit which includes the controlled by those controlled rectifiers. That composite current will flow through the potentiometer 268 and the Zener diode 270 before an arc is initiated and established, and it will flow through that arc after that arc has been initiated and established.

The minimum value of current, provided by the capacitor 200 and the upper and lower terminals of the secondary winding 66 of transformer 60, is important for several reasons. First, it keeps current flowing continuously through the potentiometers 250 and 258, or through the potentiometers 376 and 378, or through the potentiometers 442 and 444 whenever the electric welder is operating; and this means that current will flow continuously through the bias winding 120 and the control winding 118. Continuous current flow through those windings is important in helping provide closely-controlled firing signals for the controlled rectifiers 78 and 86. Second, that minimum valve of current helps supply a smoother current waveform to the electrode and workpiece which are connected, respectively, to the output terminals 154 and 156. Third, that minimum value of current will keep any arc which has been established between that electrode and workpiece from being accidentally extinguished. As a result, the electric welder provided by the present invention is able to maintain the welding current levels, called for by the settings of the movable contacts of potentiometers 250 and 258 or of the potentiometers 376 and 378 or of the potentiometers 442 and 444, within extremely close limits.

CONCLUSION

If desired, the electric welder provided by the present invention can initiate and establish an arc and can then weld at the minimum value of current provided by the capacitor 200 and the upper and lower terminals of the secondary winding 66 of transformer 60. At that current level, workpieces of aluminum which are only one-thousandth of an inch thick can be welded without pitting or perforating those workpieces. To initiate and establish an arc and then weld at the minimum value of current provided by the capacitor 200 and the upper and lower terminals of the secondary winding 66 of transformer 60, the operator will set the knobs of the potentiometers 250 and 258 in their minimum value positions; and, at such time, the current flowing in the bias winding 120 will be so high relative to the current flowing in the control winding 118 that the magnetic amplifier 108 will be effectively biased beyond cutoff; and hence the controlled rectifiers 78 and 86 will be "off," and the voltage source constituted by the capacitor 200 and the upper and lower terminals of the secondary winding 66 will be providing all of the welding current. Moreover, if desired, the minimum value of current, provided by the capacitor 200 and the upper and lower terminals of the secondary winding 66 of transformer 60, can be increased by appropriately shifting the movable contact of the adjustable resistor 198 in FIG. 1A to the left; and, where that is done, slightly thicker workpieces can be welded wholly by the minimum value of current provided by the capacitor 200 and the upper and lower terminals of the secondary winding 66 of transformer 60.

The voltages at the upper and lower terminals of the secondary winding 66 of the transformer 60 are larger than the voltages at the taps 68 and 72 of that secondary winding; and hence the provision of the circuit which includes those upper and lower terminals as well as the capacitor 200 enables the electric welder to apply a larger pre-arc voltage to the electrode and workpiece than would an electric welder which did not have that circuit. Such a larger pre-arc voltage is very desirable in facilitating prompt and certain initiation and establishment of arcs.

The controlled rectifier 78 will be rendered conductive only during those half-cycles of the alternating current supplied to the terminals 20 and 22 wherein the center tap 70 of the secondary winding 66 of the transformer 60 is positive relative to the tap 68 of that secondary winding; and the controlled rectifier 86 will be rendered conductive only during those half-cycles of the alternating current applied to those terminals wherein the center tap 70 is positive relative to the tap 72. Moreover, those controlled rectifiers will usually be conductive for less than the full durations of the half-cycles during which they are rendered conductive. As a result, there will be finite periods of time when the controlled rectifiers 78 and 86 will not be supplying power to the output terminals 154 and 158—even though an arc has been initiated and established. During those periods of time, the energy stored within the inductor 138 will tend to keep current flowing through the arc; and that current will flow from the left-hand terminal of that inductor 138 will tend to keep current via flyback diode 162, conductor 158, output terminal 156 in FIG. 1B, the workpiece and arc and electrode, output terminal 154, secondary winding 150 of the Tesla coil, conductor 148, meter shunt 146, conductor 144, one turn winding 116 in FIG. 1A, conductor 142, and junction 140 to the right-hand terminal of that inductor. The voltage source constituted by the capacitor 200 and the upper and lower terminals of the secondary winding 66 also will tend to keep current flowing through the arc. As a result accidental extinguishing of the arc is minimized.

The controlled rectifiers 78 and 86 receive firing signals from the same magnetic amplifier, they receive power from the same transformer, and their anodes are directly connected; and hence one of those controlled rectifiers can tend to adversely affect the firing angle of the other of those controlled rectifiers. However, the inductor 138 effectively overcomes that tendency; and hence each of the controlled rectifiers 78 and 86 will have the same firing angle, and will have the firing angle called for by the setting of the appropriate potentiometers 250 and 258, 376 and 378, or 442 and 444.

The use of the controlled rectifiers 78 and 86 to supply the major portion of the welding current to the output terminals 154 and 156, plus the use of the magnetic amplifier 108 to supply the firing signals for those controlled rectifiers, enables the present invention to provide an overall system which has an extremely fast time response. In fact, the time response of that overall system can be so fast that the overall system can tend to become unstable. To keep that overall system stable, the time response of that overall system is lengthened by providing the response winding 122 with one thousand turns of number 32 wire and by directly "shorting" the terminals of that winding. Because of the large number of turns of that winding, and because the terminals of that winding are shorted, that winding effectively determines the response time of the magnetic amplifier 108 and hence of the overall system which includes that magnetic amplifier and the controlled rectifiers 78 and 86. In the preferred embodiment of electric welder provided by the present invention, that response time is 9 cycles of the alternating current supplied to the terminals 20 and 22 in FIG. 1A. Such a response time is long enough to keep the operation of the electric welder stable, and yet is short enough to enable that electric welder to promptly respond to changes in the effective impedances of the arcs.

The rod 116 which is shown in FIGS. 3—5 constitutes the one turn winding 116 shown in FIG. 1A; and that one turn winding is important. First, it enables the electric welder to have one single operating range and thus obviates all need of adjustable taps on the secondary winding 66 of the transformer 60. Second, that one turn winding provides a direct numeric relationship between the current flowing through the conductor 148 in FIG. 1B and the ampere turns of feedback—the number of amperes flowing in that conductor being the exact number of ampere turns of feedback—the number of amperes flowing in that conductor being the exact number of ampere flowing in that conductor being the exact number of ampere turns of feedback. Third, that one turn winding enables the full value of the welding current to be used to provide feedback while enabling the control winding 118 to have a reasonable number of turns—that control winding having to have twice as many turns if a two-turn feedback winding was used and having to have three or more times as many turns if a three or more turn feedback winding was used. Forth, that one turn winding also serves as part of the mounting and supporting structure for the magnetic amplifier 108—thereby saving space and assembly time.

The use of the magnetic amplifier 108 to supply firing signals to the controlled rectifiers 78 and 86 is very desirable for several reasons. First, that magnetic amplifier is substantially insensitive to high-frequency voltages because of the inductance thereof; and thus it enables the electric welder provided by the present invention to use high-frequency voltages to help initiate and establish arcs without causing premature and erratic initiation of arcs. Second, that magnetic amplifier provides ohmic isolation of the firing circuits for those controlled rectifiers from the power supplied to the output terminals 154 and 156. Third, that magnetic amplifier provides a summing of the feedback, bias, control and start-bias currents. Fourth, that magnetic amplifier enables the electric welder to have a minimum of active control elements—itself plus the controlled rectifiers 78 and 86; and fifth, that magnetic amplifier permits several welders to be connected together to provide the same valves of output. Specifically, the same values of output can be obtained from two or more electric welders if all of those electric welders utilize magnetic amplifiers to provide firing signals for controlled rectifiers and if the same control current flows through the control windings of the magnetic amplifiers of all of those electric welders. With such an arrangement, all of those electric welders will "track" and none of those electric welders will "hog" the current—and hence each electric welder can supply its selected output value.

Whereas the drawing and accompanying description have shown and described a preferred embodiment of the present invention, it should be apparent to those skilled in the art that various changes may be made in the form of the invention without affecting the scope thereof.

We claim:

1. An electric welder which comprises:

a controlled rectifier that has a cathode and an anode and a gate and that can respond to the application of firing signals to said gate to make the anode-cathode circuit thereof become conductive.

a magnetic amplifier that has a plurality of input windings and that has an output winding which can develop firing signals, said output winding of said magnetic amplifier being connected to said gate of said controlled rectifier, said magnetic amplifier selectively causing said output winding thereof to supply firing signals to said gate of said controlled rectifier to render said anode-cathode circuit of said controlled rectifier conductive, output terminals that are connectable to an electrode and to a workpiece and that are connected to a source of AC by said anode-cathode circuit of said controlled rectifier, said output terminals connecting said electrode and said workpiece and said anode-cathode circuit of said controlled rectifier to series relation across said source of AC to enable said electrode and said workpiece to receive energy, said controlled rectifier permitting only unidirectional current to flow through said anode-cathode circuit thereof, and thereby causing the energy supplied to said electrode and to said workpiece to be DC energy, a source of high-frequency voltages connected in series relation with said output terminals and said electrode and said workpiece and said output winding of said magnetic amplifier and said anode-cathode circuit of said controlled rectifier to supply high-frequency voltages to said output terminals and thereby help initiate and establish an arc between said electrode and said workpiece;

said magnetic amplifier having at least one of the input windings thereof connected to said output terminals whereby the current flowing through said one input winding is subject to said high-frequency voltages supplied to said output terminals by said source of high-frequency voltages, but said magnetic amplifier having substantial inductance and thereby enabling said output winding, and the firing angles which said output winding supplies to said gate of said controlled rectifier, to be substantially insensitive to the high-frequency voltages applied to said output terminals by said source of high-frequency voltages, and whereby said electric welder makes the firing of said controlled rectifier independent of, and insensitive to, said high-frequency voltages developed by said source of high-frequency voltages.

2. An electric welder as claimed in claim 1 wherein a relay has contacts that are connected to said source of high-frequency voltages and that are selectively actuated to cause said source of high-frequency voltages to supply high-frequency voltages to said output terminals and thereby help initiate and establish an arc between said electrode and said workpiece, said relay having a finite energizing time that is longer than the duration of transients developed by said output winding of said magnetic amplifier at "turn on," whereby said transients can not cause said arc to pit, perforate or melt said workpiece as said arc is initiated.

3. An electric welder as claimed in claim 1 wherein a relay has contacts that are connected to said source of high-frequency voltages and that are selectively actuated to cause said source of high-frequency voltages to supply high-frequency voltages to said output terminals and thereby help initiate and establish an arc between said electrode and said workpiece, said relay having a finite energizing time that is longer than the duration of transients developed by said output winding of said magnetic amplifier at "turn on," whereby said transients can not cause said arc to pit, perforate or melt said workpiece as said arc is initiated, the coil of said relay being connected across said output terminals and thus being responsive to the voltage across said output terminals, said output terminals having a relatively large voltage appearing thereacross prior to the establishing of an arc between said electrode and said workpiece and said relay responding to said voltage to actuate said contacts and thereby cause said source of high-frequency voltages to supply high-frequency voltages to said output terminals, said voltage across said output terminals decreasing when an arc is established and said relay automatically responding to decrease in said voltage as an arc is established to deactuate said source of high-frequency voltages, whereby said source of high-frequency voltages will, prior to the establishing of a arc, supply high-frequency voltages to said output terminals to help initiate and establish an arc between said electrode and said workpiece but will then automatically be deactuated.

4. An electric welder which comprises:

a controlled rectifier that has a cathode and an anode and a gate and that can respond to the application of firing signals to said gate to make the anode-cathode circuit thereof become conductive, a magnetic amplifier that has a plurality of input windings and that has an output winding which can develop firing signals, said output winding of said magnetic amplifier being connected to said gate of said controlled rectifier to selectively supply firing signals to said gate of said controlled rectifier to render said anode-cathode circuit of said controlled rectifier conductive, output terminals that are connectable to an electrode and a workpiece and that are connected to said anode-cathode circuit of said controlled rectifier to receive energy from said controlled rectifier, a transformer that supplies a predetermined voltage to one terminal thereof and that supplies a high voltage to a second terminal thereof, said output terminals connecting said electrode and said workpiece in series relation with said anode-cathode circuit of said controlled rectifier and with said one terminal of said transformer, a capacitor that is connected to said second terminal of said transformer and that coacts with said transformer to act as a current source, said current source being connected to at least one input winding of said magnetic amplifier to supply substantially ripple-free current to said one input winding whenever said transformer is developing said higher voltage at said second terminal, and said one input winding of said magnetic amplifier responding to the flow of said substantially ripple-free current therethrough to cause said output winding of said magnetic amplifier to develop and supply closely controlled firing signals to said gate of said controlled rectifier.

5. An electric welder as claimed in claim 4 wherein said current source is connected to said one input winding of said magnetic amplifier by one section of a potentiometer, whereby the value of the current flowing through said one input winding of said magnetic amplifier from said current source can readily be varied by adjusting the setting of the movable contact of said potentiometer.

6. An electric welder as claimed in claim 4 wherein said current source is connected to said one input winding of said magnetic amplifier by one section of a potentiometer, whereby the value of the current flowing through said one input winding of said magnetic amplifier from said current source can readily be varied by adjusting the setting of the movable contact of said potentiometer, and wherein a voltage-regulating element is connected in parallel with said potentiometer and receives current from said current source, said current source applying sufficient voltage to said voltage-regulating element, whenever said transformer is developing said higher voltage at said second terminal, to enable said voltage-regulating element to maintain a predetermined voltage across said potentiometer prior to, during, and after the initiation and establishment of an arc.

7. An electric welder as claimed in claim 4 wherein said current source also is connected to a second input winding of said magnetic amplifier to supply substantially ripple-free current to said second input winding whenever said transformer is developing said higher voltage at said second terminal, said one winding of said magnetic amplifier being a bias winding of said magnetic amplifier and said second winding of said magnetic amplifier being a control winding of said magnetic amplifier.

8. An electric welder as claimed in claim 4 wherein said current source also is connected to a second input winding of said magnetic amplifier to supply substantially ripple-free current to said second input winding whenever said transformer is developing said higher voltage at said second terminal, said one winding of said magnetic amplifier being a bias winding of said magnetic amplifier and said second winding of said magnetic amplifier being a control winding of said magnetic amplifier, wherein a first means controls the value of the current flowing from said current source through said one winding of said magnetic amplifier, and wherein a second means controls the value of the current flowing from said current source through said second winding of said magnetic amplifier, said first said and said second means being individually adjustable to permit selective adjustments of the currents flowing from said current source through said one winding of said magnetic amplifier and through said second winding of said magnetic amplifier.

9. An electric welder as claimed in claim 4 wherein said current source is connected to said one input winding of said magnetic amplifier by a means that is adjustable to control the value of the current flowing from said current source through said one input winding of said magnetic amplifier, and wherein said current source is connected to said output terminals to cause current therefrom to flow through said output terminals and thus through any arc developed between said electrode and said workpiece.

10. An electric welder which comprises:

a controlled rectifier that has a cathode and an anode and a gate and that can respond to the application of firing signals to said gate to make the anode-cathode circuit thereof become conductive, a magnetic amplifier that has a plurality of input windings and that has an output winding which can develop firing signals, said output winding of said magnetic amplifier being connected to said gate of said controlled rectifier;

said magnetic amplifier selectively causing said output winding thereof to supply firing signals to said gate of said controlled rectifier to render said anode-cathode circuit of said controlled rectifier conductive, output terminals that are connectable to an electrode and to a workpiece and that are connected to a source of power by said anode-cathode circuit of said controlled rectifier, said output terminals connecting said electrode and said workpiece and said anode-cathode circuit of said controlled rectifier to series relation across said source of power to enable said electrode and said workpiece to receive energy, said magnetic amplifier having a start-bias winding that responds to current flow therethrough to reduce the "on" time of said output winding of said magnetic amplifier, and thus to reduce the "on" time of said anode-cathode circuit of said controlled rectifier; and a contact-free sensing element that is connected to said start-bias winding of said magnetic amplifier and to said output terminals and that permits current to flow through said start-bias winding prior to the initiation and establishment of an arc between said electrode and said workpiece but that keeps current from flowing through said start-bias winding after the initiation and establishment of an arc between said electrode and said workpiece.

11. An electric welder as claimed in claim 10 wherein said contact-free sensing element is voltage-sensitive and is connected across said output terminal to sense the voltage across said output terminals prior to, during, and after the initiation and establishment of an arc between said electrode and said workpiece, said contact-free sensing element being a solid state element.

12. An electric welder as claimed in claim 10 wherein said contact-free sensing element is a Zener diode and is connected across said output terminals to sense the voltage across said output terminals.

13. An electric welder as claimed in claim 10 wherein a transformer supplies a predetermined voltage to one terminal thereof and supplies a higher voltage to a second terminal thereof, wherein said one terminal of said transformer is said source of power and said controlled rectifier is connected to said one terminal of said transformer, wherein a capacitor is connected to said second terminal of said transformer and coacts with said transformer to act as a current source, wherein said current source is connected to said output terminals and supplies a minimum value of current to said output terminals after the initiation and establishment of an arc between said electrode and said workpiece, and wherein an adjustable element can coact with said contact-free sensing element and with said start-bias winding of said magnetic amplifier to set the current flowing through said start-bias winding at a level which will cause the "on" time of said output winding of said magnetic amplifier and the "on" item of said anode-cathode circuit of said controlled rectifier to be short enough to hold the total current supplied to said output terminals by said current source and by said anode-cathode circuit of said controlled rectifier during the initiation and establishment of said arc between said electrode and said workpiece to levels close to said minimum value of current.

14. An electric welder which comprises:

a controlled rectifier that has a cathode and an anode and a gate and that can respond to the application of firing signals to said gate to make the anode-cathode circuit thereof become conductive;

a magnetic amplifier that has a plurality of input windings and that has an output winding which can develop firing signals, said output winding of said magnetic amplifier being connected to said gate of said controlled rectifier, said magnetic amplifier selectively causing said output winding thereof to supply firing signals to said gate of said controlled rectifier to render said anode-cathode circuit of said controlled rectifier conductive;

output terminals that are connectable to an electrode and to a workpiece and that are connected to a source of power by said anode-cathode circuit of said controlled rectifier;

said output terminals connecting said electrode and said workpiece and said anode-cathode circuit of said controlled rectifier in series relation across said source of power to enable said electrode and said workpiece to receive energy, and means including one of said input windings of said magnetic amplifier to drive the flux density of the magnetic core of said magnetic amplifier downwardly toward the bottom of the hysteresis loop of said magnetic core at the termination of each welding operation.

15. An electric welder as claimed in claim 14 wherein said means also includes a capacitor which is charged up during the maintenance of an arc between said electrode and said workpiece, and wherein said one input winding of said magnetic amplifier responds to current flowing therethrough from said capacitor to drive the flux density of the magnetic core of said magnetic amplifier downwardly toward the bottom of the hysteresis loop of said magnetic core.

16. An electric welder as claimed in claim 14 wherein said means also includes a capacitor which is charged up during the maintenance of an arc between said electrode and said workpiece, wherein said one input winding is the bias winding of said magnetic amplifier, and wherein said means further includes a unidirectional element in the charging circuit of said capacitor which keeps said capacitor from discharging through said charging circuit and which forces said capacitor to discharge through said bias winding and thereby drive the flux density of the magnetic core of said magnetic amplifier downwardly toward the bottom of the hysteresis loop of said magnetic core.

17. An electric welder which comprises:

a controlled rectifier that has a cathode and an anode and a gate and that can respond to the application of firing signals to said gate to make the anode-cathode circuit thereof become conductive;

a second controlled rectifier that has a cathode and an anode and a gate and that can respond to the application of firing signals to said gate to make the anode-cathode circuit thereof become conductive;

a transformer interconnected with, and supplying power to, the anode-cathode of both of said controlled rectifiers;

a magnetic amplifier that has the output thereof connected to, and supplying firing signals to, said gates of both of said controlled rectifiers;

an inductor that is connected in series relation with an electrode and a workpiece and the anode-cathode circuits of both of said controlled rectifiers so the currents flowing through said electrode and workpiece and anode-cathode circuits of both of said controlled rectifiers also flow through it; and said inductor keeping each of said controlled rectifiers from adversely affecting the firing angle of the other of said controlled rectifiers although said anode-cathode circuits of both of said controlled rectifier s are connected to the same transformer and electrode nd workpiece although said gates of both of said controlled rectifiers are connected to the output of the same magnetic amplifier.

18. An electric welder as claimed in claim 17 wherein said controlled rectifiers have the anodes thereof connected together and wherein said inductor is connected to said anodes, wherein a flyback diode is connected in parallel relation with said interconnected transformer and said anode-cathode circuits of both of said controlled rectifiers, and wherein said inductor and said flyback diode tend to keep current flowing through an arc between said electrode and said workpiece during those periods when said anode-cathode circuits of both of said controlled rectifiers are "off."

19 An electric welder which comprises:

A controlled rectifier that has a cathode and an anode and a gate and that can respond to the application of firing signals to said gate to make the anode-cathode circuit thereof become conductive;

a magnetic amplifier that has a plurality of input windings and that has an output winding which can develop firing signals;

said output winding of said magnetic amplifier being connected to said gate of said controlled rectifier;

said magnetic amplifier selectively causing said output winding thereof to supply firing signals to said gate of said controlled rectifier to render said anode-cathode circuit of said controlled rectifier conductive;

output terminals that are connectable to an electrode and to a workpiece and that are connected to said anode-cathode circuit of said controlled rectifier to receive energy from said controlled rectifier;

a transformer that supplies a predetermined voltage to one terminal thereof and that supplies a higher voltage to a second terminal thereof;

said output terminals connecting said electrode and said workpiece to series relation with said anode-cathode circuit of said controlled rectifier and with said one terminal of said transformer; and means connecting said second terminal of said transformer to one of said output terminals to enable said second terminal of said transformer to supply said higher voltage to said output terminals and thereby facilitates the initiation and establishment of an arc between said electrode and said workpiece.

20. An electric welder as claimed in claim 19 wherein said means includes a unidirectional element to enable said means to supply DC voltage to said one output terminal, said means also including an adjustable impedance to permit the value of the current flowing through said means after the initiation and establishment of an arc between said electrode and said workpiece to be varied.

21. An electric welder which comprises:

a controlled rectifier that has a cathode and an anode and a gate and that can respond to the application of firing signals to said gate to make the anode-cathode circuit thereof become conductive;

a magnetic amplifier that has a plurality of input windings and that has an output winding which can develop firing signals;

said output winding of said magnetic amplifier being connected to said gate of said controlled rectifier;

said magnetic amplifier selectively causing said output winding thereof to supply firing signals to said gate of said controlled rectifier to render said anode-cathode circuit of said controlled rectifier conductive;

output terminals that are connectable to an electrode and to a workpiece and that are connected to a source of power by said anode-cathode circuit of said controlled rectifier;

said output terminals connecting said electrode and said workpiece and said anode-cathode circuit of said controlled rectifier in series relation across said source of power to enable said electrode and said workpiece to receive energy;

one of said input windings of said magnetic amplifier being a feedback winding;

a feedback circuit that includes said feedback winding of said magnetic amplifier; and said feedback winding of said magnetic amplifier being a one-turn winding.

22. An electric welder as claimed in claim 21 wherein said magnetic amplifier is a toroid and wherein said one-turn feedback winding is a rodlike element that extends through the cylindrical space defined by said magnetic amplifier.

23. An electric welder as claimed in claim 21 wherein said one-turn feedback winding is connected to said output terminals to have all of the welding current supplied by said electric welder pass through it.

24. an electric welder as claimed in claim 21 wherein said one-turn winding is a rodlike element that supports said magnetic amplifier.

25. An electric welder which comprises:

a controlled rectifier that has a cathode and an anode and a gate and that can respond to the application of firing signals to said gate to make the anode-cathode circuit thereof become conductive;

a magnetic amplifier that has a plurality of input windings and that has an output winding which can develop firing signals;

said output winding of said magnetic amplifier being connected to said gate of said controlled rectifier;

said magnetic amplifier selectively causing said output winding thereof to supply firing signals to said gate of said controlled rectifier to render said anode-cathode circuit of said controlled rectifier conductive;

output terminals that are connectable to an electrode and to a workpiece and that are connected to said anode-cathode circuit of said controlled rectifier to receive energy from said controlled rectifier;

terminals to supply alternating current to said output winding of said magnetic amplifier;

one of said input windings of said magnetic amplifier being a response winding which has the terminals thereof shorted; and said response winding providing a time response for said magnetic amplifier, and thus for said electric welder, which is long enough to enable said electric welder to be stable in operation.

26. An electric welder as claimed in claim 25 wherein said response winding is a multiturn winding, and wherein said time response for said magnetic amplifier makes the time response for said electric welder longer than a plurality of the cycles of the alternating current supplied to said output winding of said magnetic amplifier.

27. An electric welder which comprises:

a variable impedance element that can be connected in series relation with a source of alternating current and with an electrode and a workpiece to supply welding current to said electrode and workpiece;

said variable impedance element having a portion thereof which can respond to a bias applied thereto to set an operating parameter of said variable impedance element;

said variable impedance element having a second portion thereof which can respond to a control current supplied thereto to set a second operating parameter of said variable impedance element;

a voltage source and a capacitor which are connected to said electrode and said workpiece and which coact to supply low ripple direct current to said electrode and workpiece to help maintain an arc therebetween;

said voltage source of said capacitor being connected to said second portion of said variable impedance element to supply said control current to said second portion of said variable impedance element; and said voltage source and said capacitor being connected to the first said portion of said variable impedance element to apply said bias to said first said portion of said variable impedance element.